(12) United States Patent
Iwase et al.

(10) Patent No.: US 12,199,263 B2
(45) Date of Patent: Jan. 14, 2025

(54) METHOD OF MANUFACTURING FORMED BODY FOR ELECTRODE

(71) Applicant: FUJIFILM CORPORATION, Tokyo (JP)

(72) Inventors: Eijiro Iwase, Kanagawa (JP); Akihito Fukunaga, Kanagawa (JP); Koji Tonohara, Kanagawa (JP); Takehiko Nakayama, Kanagawa (JP); Yasuhiro Sekizawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 485 days.

(21) Appl. No.: 17/591,611

(22) Filed: Feb. 3, 2022

(65) Prior Publication Data

US 2022/0158161 A1    May 19, 2022

Related U.S. Application Data

(63) Continuation of application No. PCT/JP2020/028715, filed on Jul. 27, 2020.

(30) Foreign Application Priority Data

Aug. 19, 2019 (JP) .................. 2019-149868

(51) Int. Cl.
*H01M 4/04* (2006.01)
(52) U.S. Cl.
CPC ....... *H01M 4/0435* (2013.01); *H01M 4/0404* (2013.01)
(58) Field of Classification Search
CPC .......................... H01M 4/0435; H01M 4/0404
See application file for complete search history.

(56) References Cited

U.S. PATENT DOCUMENTS

| 2014/0225300 A1 | 8/2014 | Shibata et al. |
| 2018/0006292 A1* | 1/2018 | Nakano ............... H01M 4/1391 |

(Continued)

FOREIGN PATENT DOCUMENTS

| EP | 0867248 A1 | 9/1998 |
| JP | H04-249857 A | 9/1992 |

(Continued)

OTHER PUBLICATIONS

Machine Translation of JP-3016769-B1 (Jul. 18, 2024) (Year: 2024).*

(Continued)

*Primary Examiner* — Matthew J Merkling
(74) *Attorney, Agent, or Firm* — SOLARIS Intellectual Property Group, PLLC

(57) ABSTRACT

A method of manufacturing a formed body for an electrode includes a first step of dropping an electrode material containing an electrode active material into a gap between a pair of transport belts and introducing the electrode material between transport surfaces of the pair of transport belts; a second step of belt-transporting and pressurizing the introduced electrode material with the pair of transport belts; and a third step of transferring the electrode material after the belt transporting and the pressurization, on a deposition belt, in which a transport direction in a transport passage through which the electrode material is transported, of the deposition belt intersects a transport direction in a transport passage, through which the electrode material is transported, of the pair of transport belts.

15 Claims, 7 Drawing Sheets

(56) References Cited

U.S. PATENT DOCUMENTS

2018/0138515 A1* 5/2018 Mesuda .............. H01M 4/0404
2020/0067068 A1* 2/2020 Lee ................... H01M 10/0585

FOREIGN PATENT DOCUMENTS

| JP | H09-106816 | A | | 4/1997 | | |
|----|------------|---|---|--------|---|---|
| JP | 2000-80406 | A | | 3/2000 | | |
| JP | 3016769 | B1 | * | 3/2000 | ............ | B22F 1/0059 |
| JP | 3743706 | B2 | | 2/2006 | | |
| JP | 2007-5747 | A | | 1/2007 | | |
| JP | 2007-227666 | A | | 9/2007 | | |
| JP | 6211429 | B2 | | 10/2017 | | |
| WO | 2013/031854 | A1 | | 3/2013 | | |
| WO | 2017/104405 | A1 | | 6/2017 | | |

OTHER PUBLICATIONS

English language translation of the following: Decision of Refusal dated Mar. 22, 2023 from the JPO in a Japanese patent application No. 2021-540689 corresponding to the instant patent application.
International Search Report issued in International Application No. PCT/JP2020/028715 on Oct. 20, 2020.
Written Opinion of the ISA issued in International Application No. PCT/JP2020/028715 on Oct. 20, 2020.
English language translation of the following: Office action dated Sep. 6, 2022 from the JPO in a Japanese patent application No. 2021-540689 corresponding to the instant patent application.

* cited by examiner

METHOD OF MANUFACTURING FORMED BODY FOR ELECTRODE

CROSS-REFERENCE TO RELATED APPLICATIONS

This application is a continuation application of International Application No. PCT/JP2020/028715, filed Jul. 27, 2020, which was published under PCT Article 21(2) in Japanese, and which claims priority from Japanese Patent Application No. 2019-149868, filed Aug. 19, 2019. The above applications are hereby expressly incorporated by reference, in their entireties, into the present application.

BACKGROUND OF THE INVENTION

1. Field of the Invention

The present disclosure relates to a method of manufacturing a formed body for an electrode.

2. Description of the Related Art

An electrolytic solution has been conventionally used as an electrolyte contained in a battery such as a lithium ion battery. In recent years, from the viewpoint of safety (for example, prevention of liquid leakage), the development of an all-solid state battery that replaces an electrolytic solution with a solid electrolyte has been considered.

In addition, in the manufacturing of an electrode to be applied to the battery described above, a coating liquid containing an electrode material such as an active material and a solvent is generally used (see, for example, WO2017/104405A and JP3743706B).

As a method of manufacturing an electrode sheet used for an electrochemical element such as a lithium ion secondary battery and an electric double layer capacitor, a method of supplying an electrode material to a pair of pressing rolls placed substantially in horizontal or a belt, and forming the electrode material into a sheet-shaped formed body with the pressing rolls or the belt is disclosed (see, for example, JP2007-5747A).

A method of manufacturing an electrode for a lithium ion battery is disclosed in which a pair of pressing rolls are placed so that the tangent lines at respective press portions are in a horizontal direction, and an airflow control plate placed in contact with or close to the pressing rolls compacts a powder containing the electrode active material onto a substrate while suppressing the inclusion of air to manufacture an electrode for a lithium ion battery (see, for example, JP6211429B).

SUMMARY OF THE INVENTION

In a method of forming an electrode using a coating liquid (for example, WO2017/104405A and JP3743706B), it is usually necessary to dry the coating liquid. In a case where the drying is not sufficiently performed, a solvent may remain in the electrode, and battery performance (for example, discharge capacity and output characteristics) may thus be reduced. In particular, in an all-solid state battery, the amount of the solvent remaining in the electrode is preferably small.

On the other hand, as the method of forming an electrode without using a coating liquid, for example, the methods disclosed in JP2007-5747A and JP6211429B are suggested, but an electrode to be obtained tends to have a non-uniform density distribution (that is, mass distribution). Therefore, there is room for improvement in formability. Electrodes having a non-uniform density distribution may lead to poor battery performance.

In JP2007-5747A, in a case where the powder is not supplied in a state where the density distribution is extremely uniform, pulsation occurs in the supplied powder, and as a result, the density distribution of the powder becomes non-uniform. The non-uniformity of the density distribution of the supplied powder is reflected in a formed film, which causes deterioration of in-plane uniformity of the film.

Further, in JP6211429B, while the airflow control plate can reduce the air in a longitudinal direction, an airflow is generated in a width direction of a roll. The airflow contributes to an uneven density distribution in the width direction of the roll.

The above-described problem may occur not only in using a dry electrode material, but also in using a wet electrode material. In addition, the formability of the electrode tends to decrease as the number of components for forming the electrode is increased.

The present disclosure is contrived in view of the above.

An object to be solved by the embodiment of the present disclosure is to provide a method of manufacturing a formed body for an electrode, which maintains in-plane uniformity of mass distribution and is excellent in productivity.

Specific means for achieving the object include the following aspects.

<1> A method of manufacturing a formed body for an electrode comprising: a first step of dropping an electrode material containing an electrode active material into a gap between a pair of transport belts and introducing the electrode material between transport surfaces of the pair of transport belts; a second step of belt-transporting and pressurizing the introduced electrode material with the pair of transport belts; and a third step of transferring the electrode material after the belt transporting and the pressurization, on a deposition belt, in which a transport direction in a transport passage, through which the electrode material is transported, of the deposition belt intersects a transport direction in a transport passage, through which the electrode material is transported, of the pair of transport belts.

<2> The method of manufacturing a formed body for an electrode according to <1>, in which the electrode material contains a powder.

<3> The method of manufacturing a formed body for an electrode according to <1> or <2>, in which the second step is a step of gradually increasing a pressure applied to the electrode material toward downstream portion in a belt transport direction of the transport passage for belt-transporting the electrode material.

<4> The method of manufacturing a formed body for an electrode according to any one of <1> to <3>, in which the pair of transport belts include a first belt in which a movement direction of the transport surface in the transport passage through which the electrode material is transported is inclined in a side view to one direction of left-right directions with respect to a direction of antigravitational force, with an inclination angle θ1 of 0°<θ1≤60°, and a second belt in which the movement direction of the transport surface in the transport passage through which the electrode material is transported is inclined in a side view to the other direction in the left-right directions with respect to the direction of antigravitational force, with an inclination angle θ2 of 0°<θ2≤60°.

<5> The method of manufacturing a formed body for an electrode according to <4>, in which the second belt and the first belt are placed in this order side by side in the transport direction of the deposition belt for the electrode material, and the inclination angle θ1 and the inclination angle θ2 have a relationship of θ2≤θ1.

<6> The method of manufacturing a formed body for an electrode according to <4> or <5>, in which the second belt and the first belt are placed in this order side by side in the transport direction of the deposition belt for the electrode material, each of the first belt and the second belt is an endless belt wound around at least two rolls, and a roll of the first belt and a roll of the second belt, which are positioned at a most downstream portion of the transport passage for the electrode material in the pair of transport belts, satisfy the following Expression 1.

Diameter r1 of roll of first belt≤Diameter r2 of roll of second belt      Expression 1

<7> The method of manufacturing a formed body for an electrode according to any one of <4> to <6>, in which the second belt and the first belt are placed in this order side by side in the transport direction of the deposition belt for the electrode material, and a belt transportation speed of the first belt is higher than a belt transportation speed of the second belt.

<8> The method of manufacturing a formed body for an electrode according to any one of <4> to <7>, further comprising: a step of continuously supplying a long first support member to a transport surface, which transports the electrode material, of the second belt and a deposition surface, on which the electrode material is deposited, of the deposition belt, in which in the second step, the introduced electrode material is belt-transported and pressurized by the first support member on the second belt and the first belt, and in the third step, the electrode material is transferred to a surface of the first support member on the deposition belt.

<9> The method of manufacturing a formed body for an electrode according to <8>, further comprising: a step of continuously supplying a long second support member to a transport surface, which transports the electrode material, of the first belt and the electrode material transferred onto the deposition belt, in which in the second step, the introduced electrode material is belt-transported and pressurized through the first support member on the second belt and the second support member on the first belt, and in the third step, the electrode material is transferred to the surface of the first support member on the deposition belt in a state of being contact with the second support member.

<10> The method of manufacturing a formed body for an electrode according to any one of <4> to <7>, further comprising: a step of continuously supplying a long third support member onto the deposition belt, in which in the third step, the electrode material is transferred to a surface of the third support member on the deposition belt.

<11> The method of manufacturing a formed body for an electrode according to <10>, further comprising: a step of continuously supplying a long second support member to a transport surface, which transports the electrode material, of the first belt and the electrode material transferred onto the deposition belt, in which in the second step, the introduced electrode material is belt-transported and pressurized by the second belt and the second support member on the first belt, and in the third step, the electrode material is transferred to the surface of the third support member on the deposition belt in a state of being contact with the second support member.

<12> The method of manufacturing a formed body for an electrode according to any one of <8> to <11>, in which at least one of the first support member, the second support member, or the third support member is a collector or a release material.

<13> The method of manufacturing a formed body for an electrode according to any one of <4> to <12>, in which the second belt and the first belt are placed in this order side by side in the transport direction of the deposition belt for the electrode material, and a belt transportation speed of the deposition belt is higher than a belt transportation speed of the first belt of the pair of transport belts.

<14> The method of manufacturing a formed body for an electrode according to any one of <1> to <13>, in which in the first step, the electrode material is transported by a supplying belt, and the transported electrode material is dropped downstream portion in a transport direction of the supplying belt.

<15> The method of manufacturing a formed body for an electrode according to <14>, in which in the first step, the electrode material is transported by the supplying belt with a uniformizing member in contact with the electrode material.

<16> The method of manufacturing a formed body for an electrode according to any one of <1> to <15>, in which in the third step, the electrode material is transferred by the deposition belt with a leveling member in contact with the electrode material.

According to one embodiment of the present invention, there is provided a method of manufacturing a formed body for an electrode, which maintains in-plane uniformity of mass distribution and is excellent in productivity.

DESCRIPTION OF THE PREFERRED EMBODIMENTS

Figure 1:
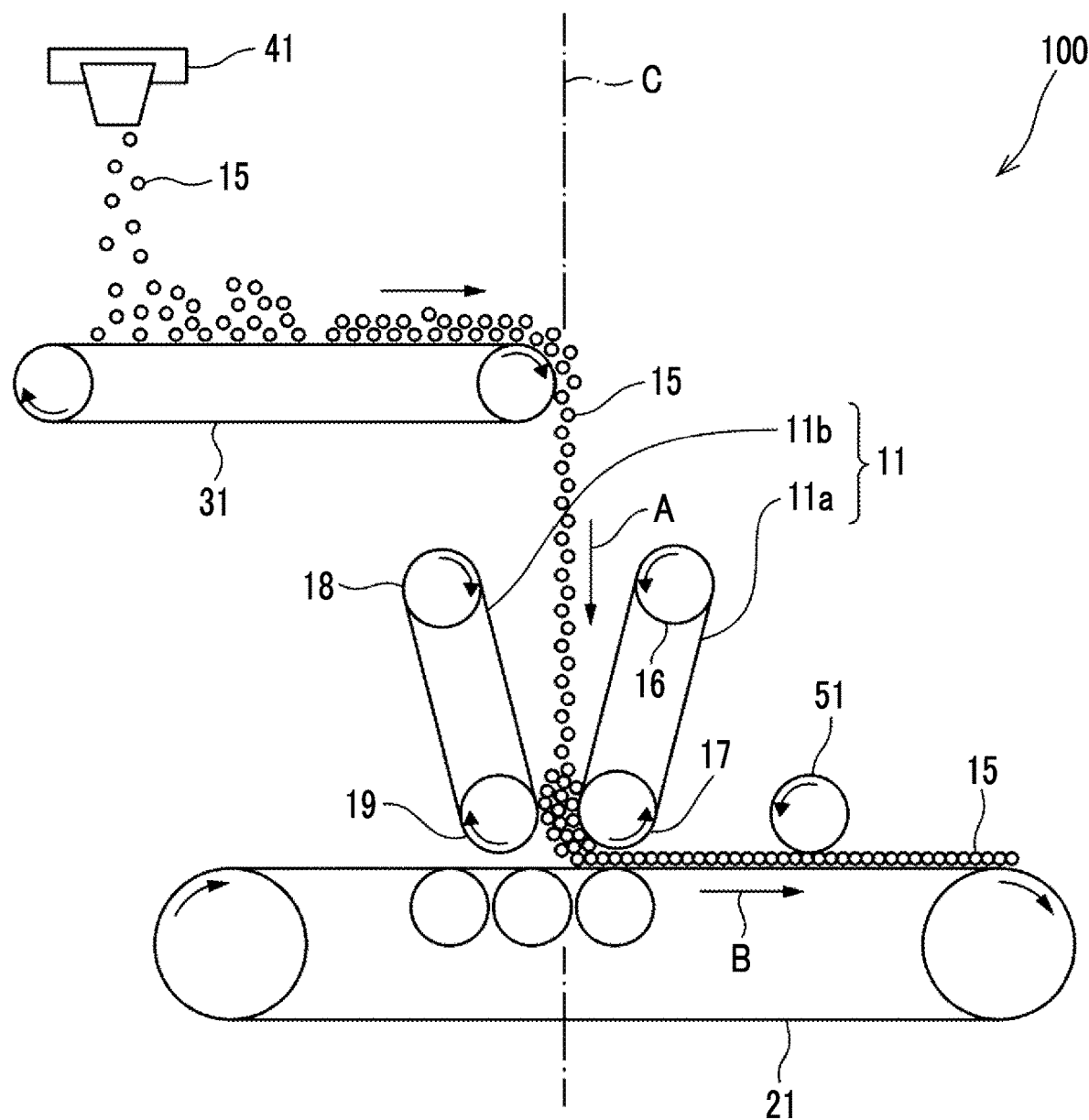
FIG. 1 shows a schematic view showing a first embodiment of a method of manufacturing a formed body for an electrode according to the present disclosure.

Hereinafter, a method of manufacturing a formed body for an electrode according to the present disclosure will be described in detail.

The present disclosure is not limited to the following embodiments to be described with reference to drawings, and may be implemented with appropriate changes within the scope of the object of the present disclosure. The constituent elements denoted by using the same references in the drawings mean that these are the same constituent elements. Descriptions of the overlapping constituent elements and references in respective embodiments may be omitted.

The dimensions in the drawings do not necessarily represent the actual dimension and a ratio.

In the present disclosure, the term "step" includes not only an independent step but also cases where it cannot be clearly distinguished from other steps, so long as the desired effect of the step can be achieved.

In addition, in the present specification, a numerical range expressed using "to" represents a range including numerical values before and after "to" as a minimum value and a maximum value. In numerical ranges described in a stepwise manner in the present disclosure, an upper limit or a lower limit described in a certain numerical range may be substituted with an upper limit or a lower limit of another numerical range described in a stepwise manner. Furthermore, in a numerical range described in the present disclosure, an upper limit or a lower limit described in a certain numerical range may be substituted with a value shown in an example.

In the present disclosure, "(meth)acrylic" means acrylic, methacrylic, or acrylic and methacrylic.

In the present disclosure, regarding the amount of each component in a composition, in a case where there are a plurality of substances corresponding to the component in the composition, the amount means a total amount of the plurality of substances present in the composition, unless otherwise specified.

In the present disclosure, "mass %" and "wt %" are synonymous, and "parts by mass" and "parts by weight" are synonymous.

In the present disclosure, a combination of two or more preferable aspects is a more preferable aspect.

In the present disclosure, the "solid content" means a component which does not disappear by volatilization or evaporation in a case where a drying treatment is performed on 1 g of a sample at 200° C. for 6 hours under a nitrogen atmosphere.

A method of manufacturing a formed body for an electrode according to the present disclosure, comprises a first step of dropping an electrode material containing an electrode active material into a gap between a pair of transport belts and introducing the electrode material between transport surfaces of the pair of transport belts; a second step of belt-transporting and pressurizing the introduced electrode material with the pair of transport belts; and a third step of transferring the electrode material after the belt transporting and the pressurization, on a deposition belt, in which a transport direction in a transport passage, through which the electrode material is transported, of the deposition belt and a transport direction in a transport passage, through which the electrode material is transported, of the pair of transport belts have an intersecting relationship.

In addition to the first to third steps, the method of manufacturing a formed body for an electrode according to the present disclosure may further include other configurations such as a step of preparing an electrode material and a step of leveling an electrode material.

Conventionally, as in JP2007-5747A, for example, a method has been known in which a pressure is applied to an electrode material by a pair of pressing rolls or belts placed substantially horizontally to pressurizing-form an electrode material. In addition, as in JP6211429B, for example, a method has been known in which a powder is supplied between a pair of pressing rolls and powder layers are compacted on both sides of a substrate traveling in a direction of gravitational force. In a case where the powder such as an electrode material is supplied to a press portion of a roll or a belt and compacted, it is important that the powder is uniformly supplied to the press portion in order to improve the uniformity of press formability.

However, in the conventionally known method, pulsation is likely to occur in the amount of the powder supplied to a gap between the pair of pressing rolls and the like. The amount or pulsation in the powder supplied to the press portion directly affects a shape of a formed body by obtained by press forming. As a result, a non-uniform mass distribution becomes to occur in the formed body.

In the method of manufacturing a formed body for an electrode according to the present disclosure, an electrode material is dropped and introduced into a gap between a pair of transport belts, and the introduced electrode material is belt-transported and pressurized by the pair of transport belts, and then transferred to another deposition belt. That is, the following manufacturing process is adopted. A supply destination of the electrode material is a gap between a pair of transport belts and the transport belts having a desired space as the gap have a transport function of carrying the electrode material on two belt surfaces and transporting the electrode material in a predetermined amount and a compact function that pressurizes the electrode material to increase the density. Then, the electrode material is transferred to the deposition belt. As a result, the uniformity of the mass distribution of the electrode material is maintained in the plane including a belt transport direction in which the electrode material is belt-transported and a belt width direction orthogonal to the belt transport direction, and the productivity of the formed body for an electrode becomes to be excellent.

The electrode material in the present disclosure preferably contains a particulate material, and more preferably contains a powder that is an aggregate of a plurality of particles. The electrode material may include, for example, a powder and a liquid component (for example, an electrolytic solution).

In the specific embodiments (first to fifth embodiments) described below, a case where powder is used is mainly shown.

In the present disclosure, the "belt transport direction" means the direction in which the electrode material is transported in the transport passage for belt transporting the electrode material in a case where the electrode material is belt-transported using a belt. For example, in a case where an endless belt wound around at least two rolls is used, the direction in which the endless belt surface (that is, a transport surface) at a portion of the traveling endless belt surface in contact with the electrode material moves.

The belt width direction means a direction orthogonal to the direction in which the belt travels (also referred to as "transports") (that is, the belt transport direction described above).

First Step

In the first step in the method of manufacturing a formed body for an electrode according to the present disclosure, an electrode material containing an electrode active material is dropped into a gap between a pair of transport belts, and the electrode material is introduced between the transport surfaces of the pair of transport belts. Since the electrode material is dropped in the direction of gravitational force and introduced into the gap of the transport belt, it is easy to perform a highly uniform introduction operation in the belt width direction (direction orthogonal to the belt transport direction) in the gap of the transport belt.

The details of the electrode material containing the electrode active material will be described later.

The method of introducing the electrode material into the gap between the pair of transport belts is not particularly limited, and a method of manually dropping the electrode material into the gap between the pair of transport belts while considering a quantitative variation of the electrode material in the belt width direction may be adopted. Further, from the viewpoint of realizing the introduction of the electrode material having more excellent uniformity, as a method of introducing the electrode material into the gap between the pair of transport belts, for example, a method of dropping the electrode material into the gap between the pair of transport belts by using a jetting device provided with an outlet for jetting the electrode material (for example, a hopper and a feeder) or a supply device such as a transport device for transporting the electrode material (for example, a supplying belt such as a rotating belt) may also be adopted.

From the viewpoint of further uniformizing the electrode material and introducing the electrode material into the gap between the pair of transport belts, it is preferable to use a supply device as a method of introducing the electrode material into the gap between the pair of transport belts.

In the jetting device having an outlet, the outlet preferably has an on-off mechanism controlling the supply of the electrode material from the viewpoint of preventing contamination due to the scattering of the electrode material. Here, the "on-off mechanism" means a movable mechanism capable of opening and closing a flow passage of the electrode material. Examples of the valve body used for the on-off mechanism include a plate-shaped valve body and a spherical valve body.

It is also preferable that the on-off mechanism is placed in the flow passage from the jetting device to the outlet.

The supplying belt such as a rotating belt may be an endless belt that is wound around at least two rolls and continuously travels on an annular track. The rotating belt is preferable in that an electrode material having better uniformity can be introduced. Specifically, as shown in FIG. 1 and the like, in the process of supplying the electrode material on the rotating belt and transferring the supplied electrode material from the upstream portion to the downstream portion of the rotating belt that rotates, the electrode material can be uniformized on the belt in advance before dropping. By uniformizing the electrode material in advance, the uniformity of the electrode material introduced by dropping in the gap between the pair of transport belts is increased.

As the supply device, for example, a plurality of feeders may be used. The electrode material may be dropped by placing a plurality of feeders in the belt width direction of the pair of transport belts and jetting the electrode material. It is preferable that the plurality of feeders are placed at equal intervals in the belt width direction of the pair of transport belts.

Examples of the feeder include a screw feeder, a disk feeder, a rotary feeder, and a belt feeder.

Figure 2:
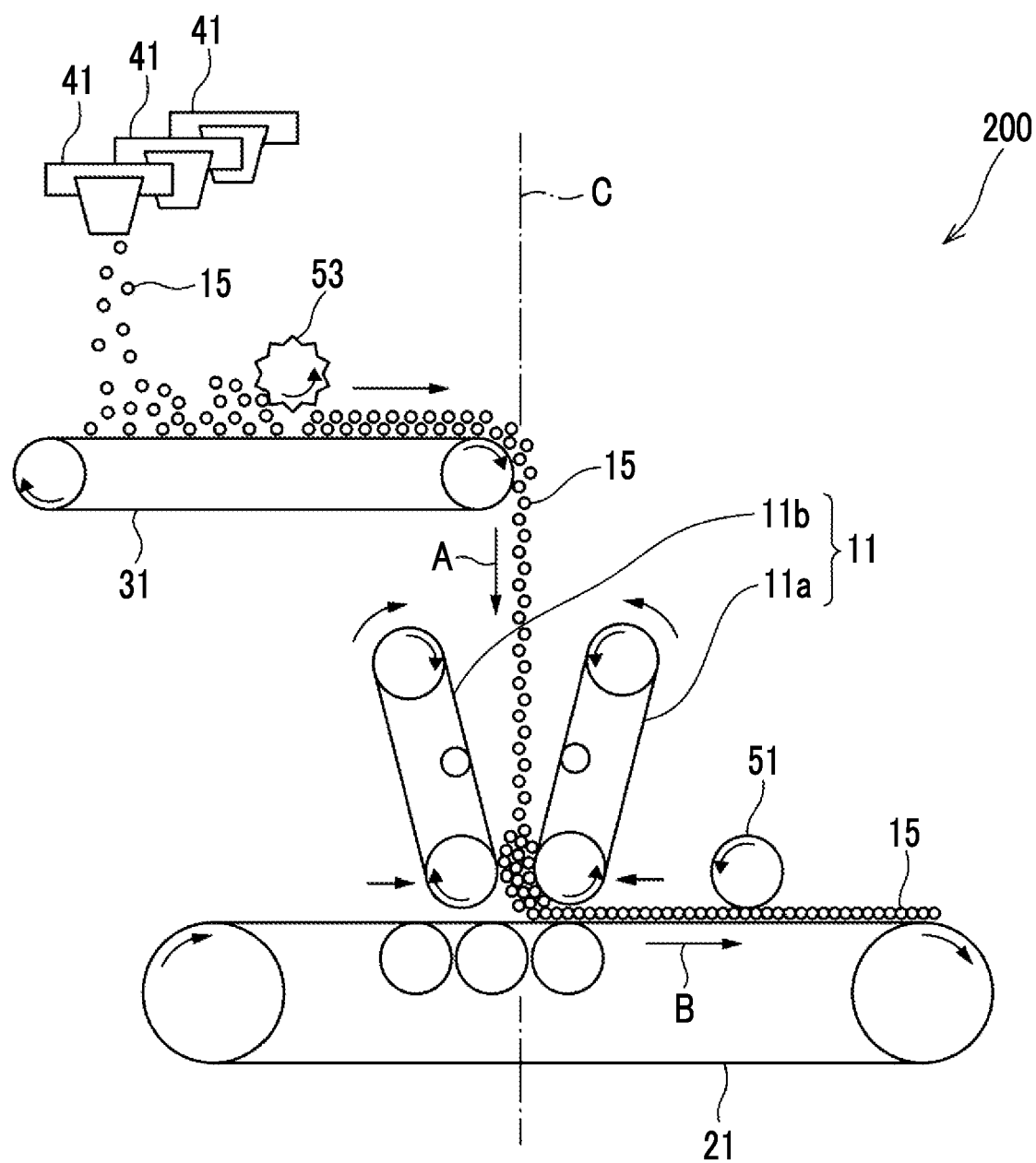
FIG. 2 shows a schematic view showing a second embodiment of a method of manufacturing a formed body for an electrode according to the present disclosure.

Among these, in the first step, it is preferable that the electrode material is transported by the supplying belt, and the transported electrode material is dropped downstream portion in a transport direction of the supplying belt to introduce the electrode material into the gap between the pair of transport belts. The supplying belt may also be an endless belt that is wound around at least two rolls and continuously travels on an annular track. Furthermore, it is preferable to use a supply device in which a plurality of jetting devices (for example, a feeder) and a supplying belt are combined. For example, as shown in FIG. 2, it is preferable to introduce the electrode material into the gap between the pair of transport belts by the endless rotating belt and a plurality of feeders placed in the belt width direction of the rotating belt.

In a case where the supplying belt is used, a belt transportation speed of the supplying belt is not particularly limited and can be appropriately selected preferably in the range of 0.1 m/min to 300 m/min.

Uniformization Step

In a case where a transport device such as a supplying belt is used in the first step, it is preferable to include a step of bringing the uniformizing member into contact with the electrode material to uniformize (hereinafter, also referred to as a uniformization step).

In the first step, it is preferable that the uniformizing member is brought into contact with the electrode material and the electrode material is transported by the supplying belt. It is preferable that the uniformizing member for uniformizing the applied electrode material is placed in the transport passage in which the electrode material of the transport device is transported, and the bias of the electrode material is further uniformized in advance before the second step described later.

The uniformization of the bias of the electrode material by the uniformizing member can be performed by a method of bringing the uniformizing member into contact with the electrode material to move the electrode material in a peripheral direction, a method of digging up the electrode material supplied by the uniformizing member, or the like.

Examples of the uniformizing member include rolls and a plate-shaped members.

In a case where the uniformizing member is a roll, examples of the roll (hereinafter, also referred to as a uniformizing roll) include a roll having a plurality of projecting structures on the roll surface, an uneven roll having an uneven inclined surface on a roll surface, a helical roll in which symmetrical grooves are machined from the center in the axial direction to both ends on the roll surface, a spiral roll having a spiral structure on the outer circumference of the rotation shaft, and the like. Further, as the uniformizing member, a member listed as a leveling member described later can also be used.

In a case where the uniformizing member is a roll, the roll diameter, the properties of the roll surface, and the like may be appropriately selected according to a method and a condition for supplying the electrode material on the supplying belt, an existence state of the electrode material, and the like.

In the uniformization step, the electrode material and the uniformizing member may be relatively moved. For example, the electrode material on the supplying belt can be uniformized while the electrode material and the uniformizing member are relatively moved. In the present disclosure, "moving the electrode material and the uniformizing member relative to each other" includes moving the uniformizing member with respect to the electrode material, moving the electrode material with respect to the uniformizing member, and moving the electrode material and the uniformizing member to each other. In a case of moving the electrode material and the uniformizing member to each other, it is preferable that the electrode material and the uniformizing member respectively move in directions that are spaced from each other along the same direction axis.

Second Step

In the second step in the method of manufacturing a formed body for an electrode according to the present disclosure, the electrode material introduced in the first step is belt-transported by the pair of transport belts and pressurized.

The amount of electrode material transferred from the second step to the third step depends on the amount of electrode material introduced in the first step, and in the second step, a thickness of the electrode material transferred to the third step can be controlled by adjusting the gap between the pair of transport belts.

The pair of transport belts are belts in which the two transport belts are placed so as to face each other at positions where the electrode material can be sandwiched and transported.

The placement relationship of the two transport belts may be such that the movement directions of the transport surfaces in the transport passage through which the electrode material is transported may be parallel to each other, and may also be oriented such that the movement directions of the transport surfaces in the transport passage through which the electrode material is transported intersect each other, or such that extension lines of the movement directions of the transport surface in the transport passage through which the electrode material is transported.

In the second step, it is preferable that by using a pair of transport belts, the electrode material introduced in the gap between the pair of transport belts in the first step is belt-transported and the electrode material is pressed at least on the downstream side in the belt transport direction for the electrode material. Furthermore, from the viewpoints of transporting the electrode material introduced in the first step by sandwiching between the two transport belts, and gradually increasing the pressure to pressurize the electrode material, it is preferable that the pair of transport belts includes two transport belts which are placed so that the movement directions of the transport surfaces in the transport passage through which the electrode material is transported intersect each other or placed so as to intersect each other in an extension line of the movement direction of the transport surface in the transport passage for transporting the electrode material (hereinafter also referred to as "V-like placement").

The V-shaped placement refers to that in a case where the transport surfaces (hereinafter, also referred to as "material transport surfaces") of the two transport belts in the transport passage through which the electrode material is transported are facing each other, the two transport belts have an placement relationship in which the material transport surfaces facing each other intersect each other, or the planes extending from each material transport surface in the transport direction for the electrode material intersect each other, so that the placement can be regarded as a V shape in the side view.

Figure 6:
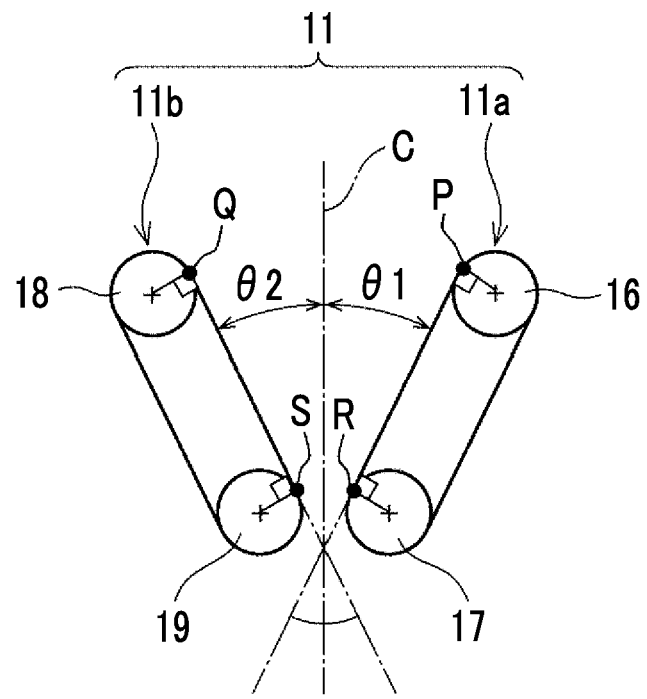
FIG. 6 shows a schematic configuration view showing an example of a pair of transport belts in the present disclosure.

A specific example of the V-shaped placement is shown in FIG. 6.

In the pair of transport belts 11, a transport belt 11a, which is an example of the first belt as one belt constituting the pair of transport belts 11, is one in the left-right direction with respect to the central axis C in the direction of antigravitational force in the side view (that is, right in the left-right direction) at an inclination angle of $\theta 1$. A transport belt 11b, which is an example of the other second belt, is placed so as to be inclined at an inclination angle $\theta 2$ to the other in the left-right direction (that is, to the left in the left-right direction) with respect to the central axis C in the direction of antigravitational force in the side view. As a result, the first belt and the second belt forming the transport belt 11 are placed in a V shape.

In a case where the two transport belts forming the pair of transport belts are placed in the V shape, the pair of transport belts include a first belt in which a movement direction of the transport surface in the transport passage through which the electrode material is transported is inclined in a side view to one direction of left-right directions with respect to a direction of antigravitational force, with an inclination angle $\theta 1$ of $0°<\theta 1 \leq 60°$, and a second belt in which the movement direction of the transport surface in the transport passage through which the electrode material is transported is inclined in a side view to the other direction in the left-right directions with respect to the direction of antigravitational force, with an inclination angle $\theta 2$ of $0°<\theta 2 \leq 60°$.

The range of the inclination angle $\theta 1$ of the first belt is more preferably $1° \leq \theta 1 \leq 60°$, even more preferably $5° \leq \theta 1 \leq 50°$, particularly preferably $10° \leq \theta 1 \leq 45°$, and most preferably $15° \leq \theta 1 \leq 40°$, in terms of ease of introduction of the electrode material.

The range of the inclination angle $\theta 2$ of the second belt is more preferably $0° \leq \theta 2 \leq 60°$, even more preferably $5° \leq \theta 2 \leq 50°$, and particularly preferably $10° \leq \theta 2 \leq 45°$ in terms of ease of introduction of the electrode material.

It is preferable that the inclination angle $\theta 1$ and the inclination angle $\theta 2$ have the relationship of $\theta 2 \leq \theta 1$ regarding a positional relationship in which the second belt and the first belt of the pair of transport belts 11 are placed in this order side by side in the transport direction (for example, the direction of arrow B in FIG. 1) of the transport passage, through which the electrode material is transported, in the deposition belt 21.

$\theta 2 = \theta 1$ means that the material transport surface of the transport belt is inclined at the same inclination angle in the left-right direction with respect to the direction of antigravitational force in the side view of the pair of transport belts.

$\theta 2 < \theta 1$ means that the inclination angles of the material transport surfaces of the transport belts, which are inclined to the left-right direction with respect to the direction of antigravitational force in the side view of the pair of transport belts, are different. In addition, $\theta 2 < \theta 1$ means that in a case where a pair of transport belts are viewed in the side view, the inclination angle of the material transport surface of the transport belt which is inclined at the inclination angle of $\theta 2$ in one direction of the left-right directions (that is, to the left in the left-right directions in the side view) with respect to the direction of antigravitational force is smaller than the inclination angle of the material transport surface of the transport belt which is inclined at the inclination angle $\theta 1$ in the other direction in the left-right direction (that is, to the right in the left-right direction in the side view) with respect to the direction of antigravitational force in a case on being viewed in the side view. In this case, for example, as shown in FIGS. 1 and 6, in the plane including the deposition surface, on which the electrode material is deposited, of the deposition belt, it becomes easy to feed the electrode material from the transport belt 11b side having the inclination angle $\theta 2$ to the transport belt 11a side having the inclination angle θ1 which is the movement direction of the deposition surface on which the electrode material of the deposition belt is deposited.

The relationship between the inclination angle θ1 and the inclination angle θ2 will be described with reference to FIG. 6.

As shown in FIG. 6, the inclination angle θ1 and the inclination angle θ2 may have the same relationship (that is, θ1=θ2) with respect to the central axis C in the direction of antigravitational force. The relationship between the inclination angle θ1 and the inclination angle θ2 is not limited to θ1=θ2, and the inclination angle θ1 and the inclination angle θ2 may be different in magnitude. Among these, as shown in FIG. 1, for example, from the viewpoint of easily sending the electrode material (powder) 15 transferred to the deposition belt in the direction of arrow B which is the belt transport direction of the deposition belt and achieving uniformization of the film thickness, the relationship between the inclination angle θ1 and the inclination angle θ2 may be θ2<θ1 in the side view. In a case where the inclination angle θ1 and the inclination angle θ2 have the relationship of θ2<θ1, it is preferable that 0°<θ2<15° and 15°<θ1≤40°.

Each of the first belt and the second belt forming the pair of transport belts is preferably an endless belt wound around at least two rolls. By sandwiching the electrode material between the material transport surfaces of the two endless belts that rotatively travel by the rotation of the two rolls respectively, the electrode material is handled by the two material transport surfaces and adjusted to the desired amount, and the electrode material can be transferred to a downstream portion in the belt transport direction.

Further, the pair of transport belts not only have a function of transferring the electrode material downstream portion in the belt transport direction, but also have a function of pressurizing the electrode material while transferring.

When the pair of transport belts pressurize the electrode material, it is preferable to pressurize the electrode material while gradually increasing the pressure applied to the electrode material toward the downstream portion in the belt transport direction in which the electrode material is belt-transported in the pair of transport belts. In a case where the pair of transport belts in the present disclosure have two transport belts placed in a V shape, the pressure applied to the electrode material is gradually increased as the electrode material is transferred to a downstream portion in the belt transport direction of the electrode material. In this case, at the downstream end portions of the pair of transport belts (for example, in the case shown in FIG. 1, between the roll 17 and roll 19 located downstream portion of the pair of transport belts 11), it is preferable that the pressure on the electrode material reaches a desired pressure.

The pressure applied to the electrode material at the downstream end portions of the pair of transport belts 11 may be appropriately selected depending on the electrode material, the thickness, and the like, and may be, for example, in the range of 1 MPa to 1000 MPa, or in the range of 5 MPa to 500 MPa.

The pressure is a value obtained by measurement using a pressure-sensitive recording material for pressure measurement, for example, can be measured by using a pressure/surface pressure measurement film (trade name: Prescale (registered trademark), manufactured by Fujifilm Co., Ltd.).

It is preferable that the second belt and the first belt forming the pair of transport belts are placed in this order side by side in the transport direction of the transport passage, through which the electrode material is transported, in the deposition belt. Further, the roll of the first belt and the roll of the second belt which are located on the most downstream portion (that is, the transfer side of the electrode material) of the transport passage of the electrode material in the pair of transport belts preferably satisfy the following Expression 1.

Diameter r1 of roll of first belt≤Diameter r2 of roll of second belt:    Expression 1

Figure 7:
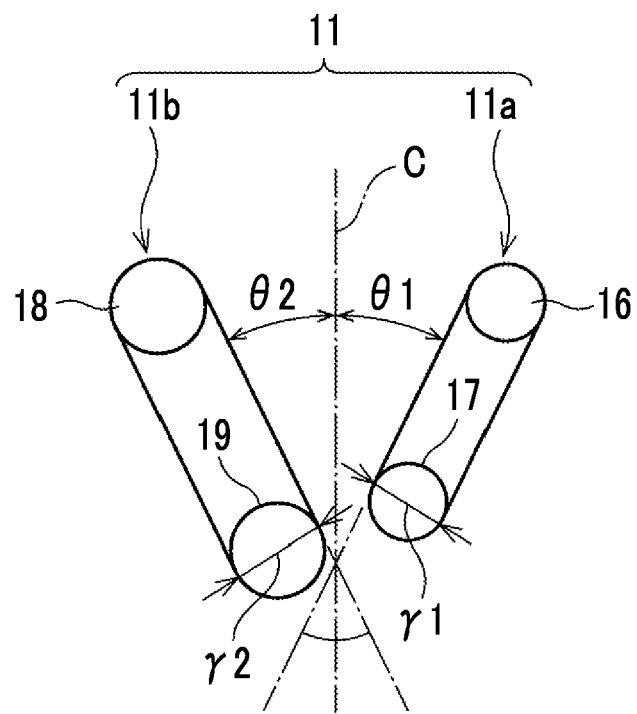
FIG. 7 shows a schematic configuration view showing another example of a pair of transport belts in the present disclosure.

For example, as in the case shown in FIG. 1 (the first embodiment described later), in the pair of transport belts 11, the transport belt 11b, which is an example of the second belt, and the transport belt 11a, which is an example of the first belt, are placed in this order side by side in the direction of arrow B, which is the belt traveling direction of the deposition belt 21. Moreover, as shown in FIG. 7, it is preferable that the roll 17 of the transport belt 11a and the roll 19 of the transport belt 11b which are located at the most downstream portion of the transport passage (the transport passage through which the electrode material is transported in the direction of arrow A in FIG. 1) of the electrode material (for example, powder) 15 in the pair of transport belts 11 satisfy the above Expression 1.

In a case where the first belt (for example, the transport belt 11a in FIG. 1) and the second belt (for example, the transport belt 11b in FIG. 1) have a relationship satisfying Expression 1, the distance between the material transport surface of the first belt and the deposition surface of the deposition belt can be made larger relative to the distance between the material transport surface of the second belt and the deposition surface of the deposition belt. As a result, as shown in FIG. 1, for example, the electrode material 15 to be transferred to the deposition belt can be easily sent in the direction of arrow B, which is the transport direction of the deposition belt.

In Expression 1, it is more preferable to satisfy the following Expression 2, and it is even more preferable to satisfy the following Expression 3. The unit of diameters r1 and r2 is "mm".

0≤(Diameter r2 of Roll−Diameter r1 of Roll)≤100:    Expression 2

1≤(Diameter r2 of Roll−Diameter r1 of Roll)≤30:    Expression 3

The diameter r1 of the roll of the first belt and the diameter r2 of the roll of the second belt are not particularly limited and may be appropriately selected depending on the purpose or the case.

In a case where each of the first belt and the second belt is formed by winding an endless belt around at least two rolls, the distance between the first belt and the second belt (transport surface-to-transport surface distance) can be set in the following range. The transport surface-to-transport surface distance is the shortest distance between the outermost surface of the first belt and the outermost surface of the second belt.

The distance (that is, the transport surface-to-transport surface distance on the introduction side) between the transport surface of the first belt and the transport surface of the second belt, which are located at the most upstream portion (that is, the introduction side of the electrode material), of the transport passage of the electrode material in the pair of transport belts can be appropriately selected in the range of 0.1 mm to 50 mm. As shown in FIG. 6, for example, the transport surface-to-transport surface distance on the introduction side is the shortest distance between a point P at which a line passing through an axial center of the roll 16 in the transport belt 11a and the material transport surface (transport surface which transports the electrode material) of the transport belt 11a intersect perpendicularly in the side view and a point Q at which the line passing through an axial center of the roll 18 on the transport belt 11b and the material transport surface of the transport belt 11b intersect perpendicularly in the side view.

In addition, the distance (that is, the transport surface-to-transport surface distance on the transfer side) between the transport surface of the first belt and the transport surface of the second belt, which are located at the most downstream portion (that is, the transport side of the electrode material), of the transport passage of the electrode material in the pair of transport belts can be appropriately selected in the range of 0.1 mm to 50 mm. As shown in FIG. 6, for example, the transport surface-to-transport surface distance on the transfer side is the shortest distance between a point R at which a line passing through an axial center of the roll 17 in the transport belt 11a and the material transport surface of the transport belt 11a intersect perpendicularly in the side view and a point S at which the line passing through an axial center of the roll 19 on the transport belt 11b and the material transport surface of the transport belt 11b intersect perpendicularly in the side view.

In the positional relationship in which the second belt and the first belt of the pair of transport belts 11 are placed in this order side by side in the direction of arrow B, which is the transport direction of the transport passage of the electrode material in the deposition belt 21, a belt transportation speed of the first belt (for example, the transport belt 11a in FIG. 1) is preferably equal to or higher than a belt transportation speed of the second belt (for example, the transport belt 11b in FIG. 1). As a result, the electrode material can be easily sent in the direction of arrow B, which is the transport direction, and the uniformity of the mass distribution of the film-shaped electrode material is further improved.

In a case where the belt transportation speed of the first belt is equal to or higher than the belt transportation speed of the second belt, the belt transportation speed of the first belt (for example, the transport belt 11a in FIG. 1) preferably has a large speed difference in the range of 0.1 m/min to 5 m/min with respect to the belt transportation speed of the second belt (for example, the transport belt 11b in FIG. 1).

In the pair of transport belts, the belt transportation speed of the first belt and the belt transportation speed of the second belt are not particularly limited and can be appropriately selected preferably in the range of 0.1 m/min to 300 m/min.

Third Step

In the third step in the method of manufacturing a formed body for an electrode of the present disclosure, the electrode material after the belt transport and pressurization in the second step is transferred onto the deposition belt. In this case, the transport direction in the transport passage, through which the electrode material is transported, of the deposition belt and the transport direction in the transport passage, through which the electrode material is transported, of the pair of transport belts have a positional relationship intersecting each other.

The transport direction in the transport passage of the deposition belt intersecting the transport direction in the transport passage of the pair of transport belts means that the electrode material transferred by the pair of transport belts is transferred to a direction different from the transport direction of the electrode material by the pair of transport belts, by the deposition belt.

Among the two transport belts of the pair of transport belts placed side by side in the transport direction of the transport passage, through which the electrode material is transported, of the deposition belt, the positional relationship between the transport belt and the deposition belt placed on the downstream side in the transport direction can be set arbitrarily. Among these, the distance (transport surface-to-deposition surface distance) between the material transport surface of the transport belt and the deposition surface of the deposition belt which are placed on the downstream side of the transport direction of the pair of transport belts is preferably set to the same distance as the "transport surface-to-transport surface distance on the transfer side" in the pair of transport belts, from the viewpoint of stably controlling the thickness of the electrode material. The transport surface-to-deposition surface distance between the transport belt placed on the downstream side in the transport direction of the pair of transport belts and the deposition belt may be appropriately selected in the range of 0.1 mm to 50 mm.

Figure 8:
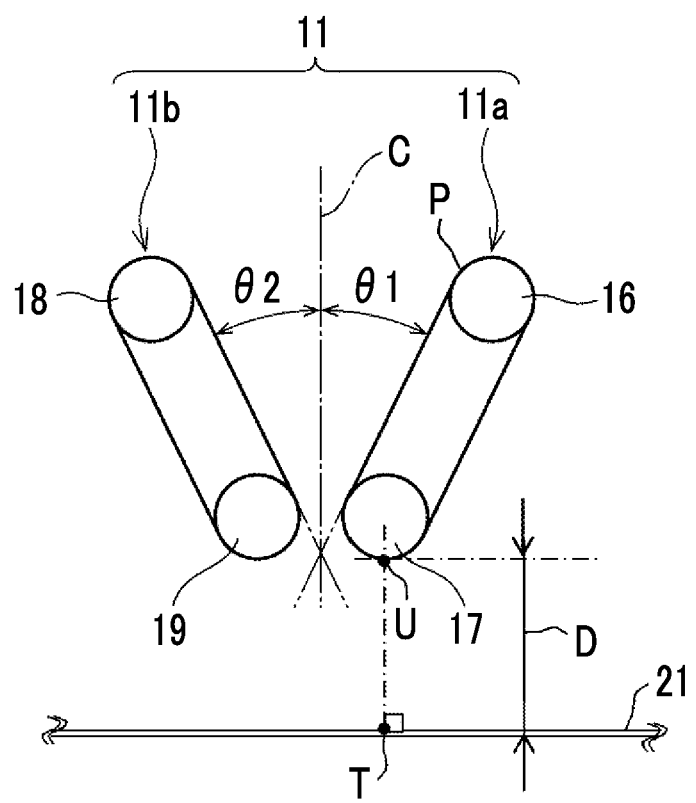
FIG. 8 shows a schematic side view for explaining a distance D between a first belt of a pair of transport belts and a deposition belt.

As shown in FIG. 8, the transport surface-to-deposition surface distance between the transport belt on the downstream side in the transport direction of the pair of transport belts and the deposition belt refers to the distance where a length between a point T on the outermost surface of the transport passage for the electrode material in the deposition belt 21 and a point U where a normal, of the deposition belt, passing through the point T intersects the outermost surface of the transport belt 11a is the shortest in the side view.

The intersecting angle at which the transport direction for the electrode material in the deposition belt and the transport direction for the electrode material in the pair of transport belts intersect is not limited as long as the angle is less than 180° on a plane including an axis parallel to the direction of gravitational force, may be appropriately selected depending on the purpose and the case, and may be, for example, in the range of 45° to 135° or in the range of 60° to 120°.

In a case where the second belt and the first belt of the pair of transport belts have a positional relationship where the second belt and the first belt are placed in this order side by side in the transport direction of the transport passage for the electrode material in the deposition belt, it is preferable that the belt traveling speed of the deposition belt is at least equal to or higher than the belt transportation speed of the first belt of the pair of transport belts. In the third step, in a case where the electrode material is transferred from the pair of transport belts to the deposition belt, a phenomenon that the electrode material flows back to the upstream portion of the second belt in the belt traveling direction of the deposition belt is suppressed, and the uniformity of the mass distribution of the film-shaped electrode material can be further improved.

In this case, the belt traveling speed of the deposition belt preferably has a large speed difference in the range of 0.1 m/min to 5 m/min with respect to the belt transportation speed of the first belt (for example, the transport belt 11a in FIG. 1).

Leveling Step

In the third step, it is preferable to include a step of bringing a leveling member into contact with the electrode material to level the electrode material. By including the leveling step, the electrode material can be transported while being leveled.

Examples of the leveling member include a roll, a press, a scraper, and a plate-shaped member (for example, squeegee). Among the above examples, the leveling member is preferably a roll from the viewpoint of continuity. The leveling member may be surface-treated. Examples of the surface treatment include silicone coating and fluorine coating.

In a case where the leveling member is a roll, the roll diameter of the roll, the properties of the roll surface, and the like may be appropriately selected according to a state and the like of the electrode material.

In the leveling step, the electrode material and the leveling member may be relatively moved. For example, the electrode material on the deposition belt can be leveled while the electrode material and the leveling member are relatively moved. In the present disclosure, "moving the electrode material and the leveling member relative to each other" includes moving the leveling member with respect to the electrode material, moving the electrode material with respect to the leveling member, and moving the electrode material and the leveling member to each other. In a case of moving the electrode material and the leveling member to each other, it is preferable that the electrode material and the leveling member respectively move in directions that are spaced from each other along the same direction axis.

First Support Member Supply Step

The method of manufacturing a formed body for an electrode according to the present disclosure preferably further includes, in addition to the above-mentioned first to third steps, a step of continuously supplying a long first support member to a transport surface, which transports the electrode material, of the second belt of the pair of transport belts and a deposition surface, on which the electrode material is deposited, of the deposition belt (hereinafter, also referred to as "first support member supply step").

In a case where the first support member supply step is provided, in the second step, the electrode material introduced into the pair of transport belts is belt-transported by the first support member on the second belt and the first belt, and pressurized. In this case, it is preferable to pressurize the electrode material at least on the downstream side in the belt transport direction for the electrode material, and it is more preferable to gradually increase the pressure on the electrode material toward the belt transport direction for the electrode material to pressurize. Moreover, in the third step, the electrode material is transferred to the surface of the first support member on the deposition belt.

By continuously supplying the long first support member to the transport surface, which transports the electrode material, of the second belt of the pair of transport belts and the deposition surface of the deposition belt, it becomes possible to apply the support member to the deposition surface of the deposition belt to which the electrode material can contact. This makes it possible to perform deposition on the support member. Further, since the first support member is placed, the properties of deposition surface of the deposition belt to which the electrode material can contact is controlled, and it is possible to deposit the electrode material on the deposition surface whose properties are controlled.

The first support member can be a collector or a release material.

The shape of the first support member is not limited. The shape of the first support member is preferably flat.

The thickness of the first support member is not limited. The average thickness of the first support member is preferably 1 μm to 500 μm, more preferably 3 μm to 300 μm, and particularly preferably 5 μm to 200 μm from the viewpoint of self-supporting property, transportability, and penetration resistance. The average thickness of the first support member is an arithmetic average of the thicknesses measured at three points by cross-section observation. In the cross-section observation, known microscopes (for example, a scanning electron microscope) can be used.

The collector is not limited, and known collectors can be used. In a case where the first support member is a collector, the electrode material can be easily placed on the collector, and moreover, productivity can be improved.

Examples of the positive electrode collector include aluminum, aluminum alloys, stainless steel, nickel, and titanium. The positive electrode collector is preferably aluminum or an aluminum alloy. The positive electrode collector is also preferably aluminum or stainless steel having a coating layer having a surface containing carbon, nickel, titanium, or silver.

Examples of the negative electrode collector include aluminum, copper, copper alloys, stainless steel, nickel, and titanium. The negative electrode collector is preferably aluminum, copper, a copper alloy, or stainless steel, and more preferably copper or a copper alloy. The negative electrode collector is also preferably aluminum, copper, a copper alloy, or stainless steel having a coating layer having a surface containing carbon, nickel, titanium, or silver.

As the collector, aluminum foil or copper foil is preferable. Aluminum foil is usually used as a collector at the positive electrode. Copper foil is usually used as a collector at the negative electrode.

Examples of the release materials include release paper, surface-treated metals (for example, surface-treated aluminum) and stainless steel (generally referred to as "SUS"), films having a coating layer, and paper having a coating layer. The coating layer can be formed by, for example, silicone coating or fluorine coating.

The first support member is preferably a release material, and more preferably release paper from the viewpoint of an improvement in releasability of the electrode material.

Second Support Member Supply Step

The method of manufacturing a formed body for an electrode according to the present disclosure preferably further includes, in addition to the above-mentioned first to third steps and the first support member supply step, a step of continuously supplying a long second support member to a transport surface, which transports the electrode material, of the first belt and the electrode material transferred onto the deposition belt (hereinafter, also referred to as "second support member supply step A").

In a second support member supply step A, the first support member supply step is also performed.

In a case where the second support member supply step A is provided, the first support member supply step is performed. Therefore, the long first support member is also continuously supplied to the transport surface, which transports the electrode material, of the second belt of the pair of transport belts and the deposition surface of the deposition belt. Therefore, in the second step, the electrode material introduced into the pair of transport belts is belt-transported by the first support member on the second belt and the second support member on the first belt, and pressurized. In this case, it is preferable to pressurize the electrode material at least on the downstream side in the belt transport direction for the electrode material, and it is more preferable to gradually increase the pressure on the electrode material toward the belt transport direction for the electrode material to pressurize. Moreover, in the third step, the electrode material is transferred to the surface of the first support member on the deposition belt in a state of being contact with the second support member.

Advantages of continuously supplying the long first support member to the transport surface, which transports the electrode material, of the second belt of the pair of transport belts and the deposition surface of the deposition belt are as described above. Moreover, the advantage of continuously supplying the long second support member onto the transport surface, which transports the electrode material, of the first belt of the pair of transport belts and the electrode material transferred on the deposition belt is that it is possible to control the contact state between the first belt of the transport passage of the electrode material in the pair of transport belts and the electrode material. By placing the second support member on the surface of the first belt, the properties of the surface of the first belt with which the electrode material can come into contact are controlled. As a result, the adhesion of the electrode material to the surface of the first belt can be suppressed to a low level.

The first support member and the second support member can be a collector or a release material.

Details of the collector and the release material, a preferred aspect, and the like are the same as in the case of the first support member in the first support member supply step described above.

In the second support member supply step A, it is preferable that one of the first support member and the second support member is a collector and the other is a release material.

In addition, the method of manufacturing a formed body for an electrode according to the present disclosure may further include, in addition to the above-mentioned first to third steps, a step of continuously supplying a long second support member to the transport surface, which transports the electrode material, of the first belt and the electrode material transferred onto the deposition belt (hereinafter, also referred to as "second support member supply step B") without providing the first support member supply step.

In a second support member supply step B, the first support member supply step is not performed.

In a case where the second support member supply step B is provided, in the second step, the electrode material introduced into the pair of transport belts is belt-transported by the second belt and the second support member located on the first belt, and pressurized. In this case, it is preferable to pressurize the electrode material at least on the downstream side in the belt transport direction for the electrode material, and it is more preferable to gradually increase the pressure on the electrode material toward the belt transport direction for the electrode material to pressurize. Moreover, in the third step, the electrode material is transferred onto the deposition belt.

By continuously supplying the long second support member onto the transport surface, which transports the electrode material, of the first belt of the pair of transport belts and the electrode material transferred on the deposition belt, it becomes possible to control the contact state between the first belt of the electrode material in the pair of transport belts and the electrode material. By placing the second support member on the surface of the first belt, it is possible to control the properties of the surface of the first belt to which the electrode material can contact. As a result, the adhesion of the electrode material to the surface of the first belt can be suppressed to a low level.

Third Support Member Supply Step

The method of manufacturing a formed body for an electrode according to the present disclosure preferably includes, in addition to the first to third steps, a step of continuously supplying a long third support member to the deposition surface of the deposition belt (hereinafter, also referred to a "third support member supply step").

By continuously supplying the long third support member to the deposition surface of the deposition belt, it becomes possible to apply the support member to the deposition surface of the deposition belt to which the electrode material can contact. This makes it possible to perform deposition on the support member. Further, since the third support member is placed, the properties of deposition surface of the deposition belt to which the electrode material can contact is controlled, and it is possible to deposit the electrode material on the deposition surface whose properties are controlled.

The third support member can be a collector or a release material.

Details of the collector and the release material, a preferred aspect, and the like are the same as in the case of the first support member in the first support member supply step described above.

Further, the second support member supply step B and the third support member supply step may be performed.

In this case, in the third support member supply step, the third support member is continuously supplied onto the deposition belt, and in the second support member supply step B, and a long second support member is continuously supplied onto the transport surface, which transports the electrode material, of the first belt and the electrode material transferred onto the third support member.

In the above, at least one of the first support member, the second support member, and the third support member can be a collector or a release material.

Details of the collector and the release material, a preferred aspect, and the like are the same as those of the first support member described above.

Preparation Step

The method of manufacturing a formed body for an electrode according to the present disclosure preferably includes a step of preparing an electrode material containing an electrode active material (preparation step) before the first to third steps.

In the present disclosure, "preparing an electrode material" means that the electrode material is made to be in a usable state, and includes preparing the electrode material unless otherwise specified. That is, in the preparation step, a pre-prepared electrode material or a commercially available electrode material may be prepared, or an electrode material may be prepared.

Electrode Material

The electrode material contains an electrode active material. The electrode material may optionally contain a component other than the electrode active material. Hereinafter, components of the electrode material will be described.

Electrode Active Material

The electrode active material is a substance capable of inserting and releasing ions of metal elements belonging to Group 1 or 2 in the periodic table. Examples of the electrode active material include positive electrode active materials and negative electrode active materials.

Positive Electrode Active Material

The positive electrode active material is not limited, and known active materials used for a positive electrode can be used. The positive electrode active material is preferably a positive electrode active material capable of reversibly inserting and releasing lithium ions.

Examples of the positive electrode active material include transition metal oxides and elements (for example, sulfur) that can be combined with lithium. Among the above examples, the positive electrode active material is preferably a transition metal oxide.

The transition metal oxide is preferably a transition metal oxide containing at least one transition metal element (hereinafter, referred to as "element Ma") selected from the group consisting of cobalt (Co), nickel (Ni), iron (Fe), manganese (Mn), copper (Cu), and vanadium (V).

In a case where the transition metal oxide contains Li and Ma, a molar ratio (Li/Ma) of Li to the element Ma is preferably 0.3 to 2.2.

In addition, the transition metal oxide may contain at least one transition metal element (hereinafter, referred to as "element Mb") selected from the group consisting of Group 1 elements other than lithium, Group 2 elements, aluminum (Al), gallium (Ga), indium (In), germanium (Ge), tin (Sn), lead (Pb), antimony (Sb), bismuth (Bi), silicon (Si), phosphorus (P), and boron (B). The content of the element Mb is preferably 0 mol % to 30 mol % with respect to the substance amount of the element Ma.

Examples of the transition metal oxide include transition metal oxides having a bedded salt-type structure, transition metal oxides having a spinel-type structure, lithium-containing transition metal phosphate compounds, lithium-containing transition metal halogenated phosphate compounds, and lithium-containing transition metal silicate compounds.

Examples of the transition metal oxides having a bedded salt-type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Examples of the transition metal oxides having a spinel-type structure include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds include olivine-type iron phosphate salts (for example, $LiFePO_4$ and $Li_3Fe_2(PO_4)_3$), iron pyrophosphate salts (for example, $LiFeP_2O_7$), cobalt phosphate salts (for example, $LiCoPO_4$), and monoclinic nasicon-type vanadium phosphate salts (for example, $Li_3V_2(PO_4)_3$ (lithium vanadium phosphate)).

Examples of the lithium-containing transition metal halogenated phosphate compounds include fluorinated iron phosphate salts (for example, $Li_2FePO_4F$), fluorinated manganese phosphate salts (for example, $Li_2MnPO_4F$), and fluorinated cobalt phosphate salts (for example, $Li_2CoPO_4F$).

Examples of the lithium-containing transition metal silicate compounds include $Li_2FeSiO_4$, $Li_2MnSiO_4$, and $Li_2CoSiO_4$.

The transition metal oxide is preferably a transition metal oxide having a bedded salt-type structure, and more preferably at least one compound selected from the group consisting of $LiCoO_2$ (lithium cobalt oxide [LCO]), $LiNi_{0.85}Co_{0.10}Al_{0.05}O_2$ (lithium nickel cobalt aluminum oxide [NCA]), and $LiNi_{1/3}Co_{1/3}Mn_{1/3}O_2$ (lithium nickel manganese cobalt oxide [NMC]).

The positive electrode active material may be a commercially available product or may be manufactured by a known method (for example, a firing method). As the positive electrode active material obtained by the firing method, a positive electrode active material washed with water, an acidic aqueous solution, an alkaline aqueous solution, or an organic solvent may be used.

The composition of the positive electrode active material is measured using inductive coupling plasma (ICP) emission spectrometric analysis.

The shape of the positive electrode active material is not limited, and is preferably a particulate shape from the viewpoint of handleability.

The volume average particle diameter of the positive electrode active material is not limited, and may be, for example, 0.1 μm to 50 μm. The volume average particle diameter of the positive electrode active material is preferably 0.3 μm to 40 μm, and more preferably 0.5 μm to 30 μm. In a case where the volume average particle diameter of the positive electrode active material is 0.3 μm or more, it is possible to easily form an aggregate of the electrode material, and it is possible to suppress the scattering of the electrode material during handling. In a case where the volume average particle diameter of the positive electrode active material is 40 μm or less, it is possible to easily adjust the thickness of a formed body for an electrode, and it is possible to suppress the generation of voids during the course of forming.

The volume average particle diameter of the positive electrode active material is measured by the following method. A dispersion liquid containing 0.1 mass % of the positive electrode active material is prepared by mixing the positive electrode active material with a solvent (for example, heptane, octane, toluene, or xylene). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the positive electrode active material. For other detailed conditions, refer to "JIS Z 8828: 2013" as necessary.

Examples of the method of adjusting the particle diameter of the positive electrode active material include a method using a pulverizer or a classifier.

The electrode material may contain one kind of positive electrode active material alone, or two or more kinds of positive electrode active materials.

The content of the positive electrode active material is preferably 10 mass % to 95 mass %, more preferably 30 mass % to 90 mass %, even more preferably 50 mass % to 85 mass %, and particularly preferably 60 mass % to 80 mass % with respect to the total solid content mass of the electrode material.

Negative Electrode Active Material

The negative electrode active material is not limited, and known active materials used for a negative electrode can be used. The negative electrode active material is preferably a negative electrode active material capable of reversibly inserting and releasing lithium ions.

Examples of the negative electrode active material include carbonaceous materials, metal oxides (for example, tin oxide), silicon oxides, metal composite oxides, lithium single bodies, lithium alloys (for example, lithium aluminum alloy), and metals (for example, Sn, Si, and In) that can form an alloy with lithium. Among the above examples, the negative electrode active material is preferably a carbonaceous material or a lithium composite oxide from the viewpoint of reliability.

The carbonaceous material is substantially a material consisting of carbon. Examples of the carbonaceous material include carbonaceous materials obtained by firing petroleum pitch, carbon black (for example, acetylene black), graphite (for example, natural graphite and artificial graphite (for example, vapor-grown graphite)), hard carbon, or synthetic resins (for example, polyacrylonitrile (PAN) and furfuryl alcohol resin). Examples of the carbonaceous material also include carbon fibers (for example, polyacrylonitrile-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and activated carbon fibers). Examples of the graphite include mesophase microspheres, graphite whisker, and flat graphite. In the present disclosure, "flat" means having two principal planes which face each other.

The metal composite oxide is preferably a metal composite oxide capable of storing and releasing lithium. The metal composite oxide capable of storing and releasing lithium preferably contains at least one element selected from the group consisting of titanium and lithium from the viewpoint of high current density charging and discharging characteristics.

The metal oxide and the metal composite oxide are particularly preferably amorphous oxides. Here, "amorphous" means having a broad scattering band having a peak at 20° to 40° in terms of 2θ in an X-ray diffraction method using CuKα rays, and may have a crystalline diffraction line. In the amorphous oxide, the highest intensity of the crystalline diffraction lines observed at 40° to 70° in terms of 2θ is preferably 100 times or less, and more preferably 5 times or less the intensity of a diffraction line having a peak in a broad scattering band observed at 20° to 40° in terms of 2θ. The amorphous oxide particularly preferably has no crystalline diffraction line.

The metal oxide and the metal composite oxide are also preferably chalcogenides. A chalcogenide is a reaction product of a metal element and an element of Group 16 in the periodic table.

Among the compound group consisting of amorphous oxides and chalcogenides, amorphous oxides and chalcogenides of metalloid elements are preferable, and oxides and chalcogenides containing at least one element selected from the group consisting of elements of Groups 13 to 15 in the periodic table, Al, Ga, Si, Sn, Ge, Pb, Sb, and Bi are more preferable.

Preferable examples of the amorphous oxides and chalcogenides include $Ga_2O_3$, $SiO$, $GeO$, $SnO$, $Sn_{O2}$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, the above-described compound may be a composite oxide with lithium (for example, $Li_2SnO_2$).

The negative electrode active material preferably further contains titanium. The negative electrode active material containing titanium is preferably $Li_4Ti_5O_{12}$ (lithium titanate [LTO]) from the viewpoint that it has excellent high-speed charging and discharging characteristics since the volume thereof changes only to a small extent during the storing and release of lithium ions, and the life of the lithium ion secondary battery can be improved due to the suppression of deterioration of the electrode.

The negative electrode active material may be a commercially available product or may be manufactured by a known method (for example, a firing method). As the negative electrode active material obtained by the firing method, a negative electrode active material washed with water, an acidic aqueous solution, an alkaline aqueous solution, or an organic solvent may be used.

For example, CGB20 (Nippon Graphite Industries, Co., Ltd.) is available as the negative electrode active material.

The composition of the negative electrode active material is measured using inductive coupling plasma (ICP) emission spectrometric analysis.

The shape of the negative electrode active material is not limited, and is preferably a particulate shape from the viewpoint of easy handling and easy control of uniformity during mass production.

The volume average particle diameter of the negative electrode active material is preferably 0.1 μm to 60 μm, more preferably 0.3 μm to 50 μm, and particularly preferably 0.5 μm to 40 μm. In a case where the volume average particle diameter of the negative electrode active material is 0.1 μm or more, it is possible to easily form an aggregate of the electrode material, and it is possible to suppress the scattering of the electrode material during handling. In a case where the volume average particle diameter of the negative electrode active material is 60 μm or less, it is possible to easily adjust the thickness of a formed body for an electrode, and it is possible to suppress the generation of voids during the course of forming. The volume average particle diameter of the negative electrode active material is measured by a method according to the method of measuring the volume average particle diameter of the positive electrode active material.

Examples of the method of adjusting the particle diameter of the negative electrode active material include a method using a pulverizer or a classifier. In the above-described method, for example, a mortar, a ball mill, a sand mill, a vibrating ball mill, a satellite ball mill, a planetary ball mill, a swirling airflow-type jet mill, or a sieve is suitably used. In the pulverization of the negative electrode active material, wet pulverization using water or an organic solvent (for example, methanol) can also be optionally performed. The method of adjusting to a desired particle diameter is preferably classification. In the classification, for example, a sieve or a wind power classifier can be used. The classification may be performed in a dry manner or in a wet manner.

In a case where an amorphous oxide containing Sn, Si, or Ge is used as the negative electrode active material, preferable examples of the negative electrode active material that can be used in combination with the above-described amorphous oxide include carbon materials capable of storing and releasing lithium ions or a lithium metal, lithium, lithium alloys, and metals capable of being alloyed with lithium.

The electrode material may contain one kind of negative electrode active material alone, or two or more kinds of negative electrode active materials.

The content of the negative electrode active material is preferably 10 mass % to 80 mass %, more preferably 20 mass % to 80 mass %, even more preferably 30 mass % to 80 mass %, and particularly preferably 40 mass % to 75 mass % with respect to the total solid content mass of the electrode material.

The surfaces of the positive electrode active material and the negative electrode active material may be coated with a surface coating agent. Examples of the surface coating agent include metal oxides containing Ti, Nb, Ta, W, Zr, Si, or Li. Examples of the metal oxides include titanate spinels, tantalum-based oxides, niobium-based oxides, and lithium niobate-based compounds. Specific examples of the compounds include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, and $LiBO_2$.

Inorganic Solid Electrolyte

The electrode material preferably contains an inorganic solid electrolyte from the viewpoint of an improvement in battery performance (for example, discharge capacity and output characteristics). Here, the "solid electrolyte" means a solid-state electrolyte in which ions can move inside thereof.

Since the inorganic solid electrolyte is not an electrolyte containing an organic substance as a principal ion-conductive material, it is clearly differentiated from organic solid electrolytes (for example, polymer electrolytes represented by polyethylene oxide (PEO), and organic electrolyte salts represented by lithium bis(trifluoromethanesulfonyl)imide (LiTFSI)). In addition, since the inorganic solid electrolyte is solid at steady state, it is not dissociated or liberated into cations or anions. Therefore, the inorganic solid electrolyte is also clearly differentiated from inorganic electrolyte salts (for example, $LiPF_6$, $LiBF_4$, lithium bis(fluoroulfonyl)imide (LiFSI), and LiCl) that are dissociated or liberated into cations or anions in electrolytic solutions or polymers.

The inorganic solid electrolyte is not limited as long as it is an inorganic solid electrolyte having ion conductivity of a metal element belonging to Group 1 or 2 in the periodic table, and generally does not have electron conductivity.

In a case where a formed body for an electrode obtained by the method of manufacturing a formed body for an electrode according to the present disclosure is used for a lithium ion battery, the inorganic solid electrolyte preferably has lithium ion conductivity.

Examples of the inorganic solid electrolyte include sulfide-based inorganic solid electrolytes and oxide-based inorganic solid electrolytes. Among the above examples, the inorganic solid electrolyte is preferably a sulfide-based inorganic solid electrolyte from the viewpoint that a good interface can be formed between the active material and the inorganic solid electrolyte.

Sulfide-Based Inorganic Solid Electrolyte

The sulfide-based inorganic solid electrolyte preferably contains a sulfur atom (S), has ion conductivity of a metal element belonging to Group 1 or 2 in the periodic table, and has an electron-insulating property.

The sulfide-based inorganic solid electrolyte more preferably contains at least Li, S, and P, and has lithium ion conductivity. The sulfide-based inorganic solid electrolyte may optionally contain an element other than Li, S, and P.

Examples of the sulfide-based inorganic solid electrolyte include an inorganic solid electrolyte having a composition represented by Expression (A).

$$L_{a1}M_{b1}P_{c1}S_{d1}A_{e1} \quad (A)$$

In Expression (A), L represents at least one element selected from the group consisting of Li, Na, and K, and is preferably Li.

In Expression (A), M represents at least one element selected from the group consisting of B, Zn, Sn, Si, Cu, Ga, Sb, Al, and Ge, and is preferably B, Sn, Si, Al, or Ge, and more preferably Sn, Al, or Ge.

In Expression (A), A represents at least one element selected from the group consisting of I, Br, Cl, and F, and is preferably I or Br, and more preferably I.

In Expression (A), a1 represents 1 to 12, and is preferably 1 to 9, and more preferably 1.5 to 4.

In Expression (A), b1 represents 0 to 1, and is more preferably 0 to 0.5.

In Expression (A), c1 represents 1.

In Expression (A), d1 represents 2 to 12, and is preferably 3 to 7, and more preferably 3.25 to 4.5.

In Expression (A), e1 represents 0 to 5, and is preferably 0 to 3, and more preferably 0 to 1.

In Expression (A), it is preferable that b1 and e1 are 0, it is more preferable that b1 and e1 are 0, and a ratio of a1, c1, and d1 is 1 to 9:1:3 to 7, and it is particularly preferable that b1 and e1 are 0, and a ratio of a1, c1, and d1 is 1.5 to 4:1:3.25 to 4.5.

The compositional ratio of each element can be controlled by adjusting an amount of the raw material compound to be blended in the manufacturing of the sulfide-based inorganic solid electrolyte.

The sulfide-based inorganic solid electrolyte may be amorphous (glass) or crystallized (glass ceramics), or only partially crystallized. Examples of the sulfide-based inorganic solid electrolyte described above include Li—P—S-based glass containing Li, P, and S, and Li—P—S-based glass ceramics containing Li, P, and S. Among the above examples, the sulfide-based inorganic solid electrolyte is preferably Li—P—S-based glass.

The lithium ion conductivity of the sulfide-based inorganic solid electrolyte is preferably $1 \times 10^{-4}$ S/cm or more, and more preferably $1 \times 10^{-3}$ S/cm or more. The upper limit of lithium ion conductivity is not limited. The lithium ion conductivity is substantially $1 \times 10^{-1}$ S/cm or less.

The sulfide-based inorganic solid electrolyte can be manufactured by, for example, (1) a reaction of lithium sulfide ($Li_2S$) and phosphorus sulfide (for example, diphosphorus pentasulfide ($P_2S_5$)), (2) a reaction of lithium sulfide and at least one of a phosphorus single body or a sulfur single body, or (3) a reaction of lithium sulfide, phosphorus sulfide (for example, diphosphorus pentasulfide ($P_2S_5$)), and at least one of a phosphorus single body or a sulfur single body.

The molar ratio of $Li_2S$ to $P_2S_5$ ($Li_2S:P_2S_5$) in the manufacturing of the Li—P—S-based glass and the Li—P—S-based glass ceramics is preferably 65:35 to 85:15, and more preferably 68:32 to 77:23. By setting the molar ratio of $Li_2S$ to $P_2S_5$ within the above range, lithium ion conductivity can be further increased.

Examples of the sulfide-based inorganic solid electrolyte include a compound prepared using a raw material composition containing $Li_2S$ and a sulfide of an element of Groups 13 to 15. Examples of the raw material composition include $Li_2S$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among the above examples, the raw material composition is preferably $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$, and more preferably $Li_2S$—$P_2S_5$, $Li_{10}GeP_2S_{12}$, or $Li_2S$—$P_2S_5$—$SiS_2$ from the viewpoint of high lithium ion conductivity.

Examples of the method of manufacturing the sulfide-based inorganic solid electrolyte material using the above-described raw material composition include an amorphization method. Examples of the amorphization method include a mechanical milling method and a melting quenching method. Among the above examples, a mechanical milling method is preferable from the viewpoint that the treatment can be performed at normal temperature and the manufacturing step can be simplified.

Oxide-Based Inorganic Solid Electrolyte

The oxide-based inorganic solid electrolyte preferably contains an oxygen atom (O), has ion conductivity of a metal element belonging to Group 1 or Group 2 in the periodic table, and has an electron-insulating property.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit of ion conductivity is not limited. The ion conductivity is substantially $1\times10^{-1}$ S/cm or less.

Examples of the oxide-based inorganic solid electrolyte include the following compounds. However, the oxide-based inorganic solid electrolyte is not limited to the following compounds.

(1) $Li_{xa}La_{ya}TiO_3$ (hereinafter referred to as "LLT", xa satisfies $0.3 \leq xa \leq 0.7$ and ya satisfies $0.3 \leq ya \leq 0.7$)

(2) $Li_{xb}La_{yb}Zr_{zb}M^{bb}{}_{mb}O_{nb}$ ($M^{bb}$ is at least one element selected from the group consisting of Al, Mg, Ca, Sr, V, Nb, Ta, Ti, Ge, In, and Sn. xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$)

(3) $Li_{xc}B_{yc}M^{cc}{}_{zc}O_{nc}$ ($M^{cc}$ is at least one element selected from the group consisting of C, S, Al, Si, Ga, Ge, In, and Sn. xc satisfies $0 \leq xc \leq 5$, yc satisfies $0 \leq yc \leq 1$, zc satisfies $0 \leq zc \leq 1$, and nc satisfies $0 \leq nc \leq 6$)

(4) $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, and satisfies $1 \leq md \leq 7$, and nd satisfies $3 \leq nd \leq 13$)

(5) $Li_{(3-2xe)}M^{ee}{}_{xe}D^{ee}O$ (xe satisfies $0 \leq xe \leq 0.1$, $M^{ee}$ represents a divalent metal atom, and $D^{ee}$ represents a halogen atom or a combination of two or more halogen atoms)

(6) $Li_{xf}Si_{yf}O_{zf}$ (xf satisfies $1 \leq xf \leq 5$, yf satisfies $0 \leq yf \leq 3$, and zf satisfies $1 \leq zf \leq 10$)

(7) $Li_{xg}S_{yg}O_{zg}$ (xg satisfies $1 \leq xg \leq 3$, yg satisfies $0 \leq yg \leq 2$, and zg satisfies $1 \leq zg \leq 10$)

(8) $Li_3BO_3$ (9) $Li_3BO_3$-$Li_2SO_4$

(10) $Li_2O$—$B_2O_3$—$P_2O_5$

(11) $Li_2O$—$SiO_2$

(12) $Li_6BaLa_2Ta_2O_{12}$

(13) $Li_3PO_{(4-3/2w)}N_w$ (w satisfies w<1)

(14) $Li_{3.5}Zn_{0.25}GeO_4$ having a lithium super ionic conductor (LISICON)-type crystal structure

(15) $La_{0.55}Li_{0.35}TiO_3$ having a perovskite-type crystal structure

(16) $LiTi_2P_3O_{12}$ having a natrium super ionic conductor (NASICON)-type crystal structure

(17) $Li_{1+xh+yh}(Al, Ga)_{xh}(Ti, Ge)_{2-xh}Si_{yh}P_{3-yh}O_{12}$ (xh satisfies $0 \leq xh \leq 1$, and yh satisfies $0 \leq yh \leq 1$)

(18) $Li_7La_3Zr_2O_{12}$ having a garnet-type crystal structure (hereinafter referred to as "LLZ")

As the oxide-based inorganic solid electrolyte, phosphorus compounds containing Li, P, and O are also preferable.

Examples of the phosphorus compounds containing Li, P, and O include lithium phosphate ($Li_3PO_4$), UPON in which a part of oxygen of lithium phosphate is substituted with nitrogen, and LiPOD1 (D1 is at least one element selected from the group consisting of Ti, V, Cr, Mn, Fe, Co, Ni, Cu, Zr, Nb, Mo, Ru, Ag, Ta, W, Pt, and Au).

As the oxide-based inorganic solid electrolyte, $LiA^1ON$ ($A^1$ is at least one element selected from the group consisting of Si, B, Ge, Al, C, and Ga) is also preferable.

Among the above examples, the oxide-based inorganic solid electrolyte is preferably LLT, $Li_{xb}La_{yb}Zr_{zb}M^{bb}{}_{mb}O_{nb}$ ($M^{bb}$, xb, yb, zb, mb, and nb are as described above), LLZ, $Li_3BO_3$, $Li_3BO_3$—$Li_2SO_4$, or $Li_{xd}(Al, Ga)_{yd}(Ti, Ge)_{zd}Si_{ad}P_{md}O_{nd}$ (xd, yd, zd, ad, md, and nd are as described above), more preferably LLT, LLZ, LAGP ($Li_{1.5}Al_{0.5}Ge_{1.5}(PO_4)_3$), or LATP ([$Li_{1.4}Ti_2Si_{0.4}P_{2.6}O_{12}$]—$AlPO_4$), and particularly preferably LLZ.

The inorganic solid electrolyte preferably has a particulate shape.

The volume average particle diameter of the inorganic solid electrolyte is preferably 0.01 µm or more, and more preferably 0.1 µm or more. The volume average particle diameter of the inorganic solid electrolyte is preferably 100 µm or less, and more preferably 50 µm or less.

The volume average particle diameter of the inorganic solid electrolyte is measured by the following method. A dispersion liquid containing 1 mass % of the inorganic solid electrolyte is prepared by mixing the inorganic solid electrolyte with water (heptane in a case of a substance unstable to water). A dispersion liquid irradiated with 1 kHz ultrasonic waves for 10 minutes is used as a measurement sample. Using a laser diffraction/scattering-type particle size distribution analyzer (for example, LA-920 manufactured by HORIBA, Ltd.), data is captured 50 times under the condition of a temperature of 25° C. to obtain a volume average particle diameter. A quartz cell is used as the measurement cell. The above measurement is performed using five samples, and an average of the measured values is defined as the volume average particle diameter of the inorganic solid electrolyte. For other detailed conditions, refer to "JIS Z 8828: 2013" as necessary.

The electrode material may contain one kind of inorganic solid electrolyte alone, or two or more kinds of inorganic solid electrolytes.

In a case where the electrode material contains an inorganic solid electrolyte, the content of the inorganic solid electrolyte is preferably 1 mass % or more, more preferably 5 mass % or more, and particularly preferably 10 mass % or more with respect to the total solid content mass of the electrode material from the viewpoint of reduction of interface resistance and a battery characteristic maintaining effect (improvement in cycle characteristics). From the same viewpoint, the content of the inorganic solid electrolyte is preferably 90 mass % or less, more preferably 70 mass % or less, and particularly preferably 50 mass % or less with respect to the total solid content mass of the electrode material.

Binder

The electrode material preferably contains a binder from the viewpoint of an improvement in adhesiveness between the electrode materials. The binder is not limited as long as it is an organic polymer, and known binders used as a binder in a positive electrode or a negative electrode of the battery material can be used. Examples of the binder include fluorine-containing resins, hydrocarbon-based thermoplastic resins, acrylic resins, and urethane resins.

Examples of the fluorine-containing resins include polytetrafluoroethylene (PTFE), polyvinylene difluoride (PVdF), and a copolymer of polyvinylene difluoride and hexafluoropropylene (PVdF-HFP).

Examples of the hydrocarbon-based thermoplastic resins include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resins include methyl poly(meth)acrylate, ethyl poly(meth)acrylate, isopropyl poly(meth)acrylate, isobutyl poly(meth)acrylate, butyl poly(meth)acrylate, hexyl poly(meth)acrylate, octyl poly(meth)acrylate, dodecyl poly(meth)acrylate, stearyl poly(meth)acrylate, 2-hydroxyethyl poly(meth)acrylate, poly(meth)acrylate, benzyl poly(meth)acrylate, glycidyl poly(meth)acrylate, dimethylaminopropyl poly(meth)acrylate, and copolymers of monomers forming the above resins.

Examples of the binder also include copolymers of vinyl-based monomers. Examples of the copolymers of vinyl-based monomers include a methyl (meth)acrylate-styrene copolymer, a methyl (meth)acrylate-acrylonitrile copolymer, and a butyl (meth)acrylate-acrylonitrile-styrene copolymer.

The weight-average molecular weight of the binder is preferably 10,000 or more, more preferably 20,000 or more, and particularly preferably 50,000 or more. The weight-average molecular weight of the binder is preferably 1,000,000 or less, more preferably 200,000 or less, and particularly preferably 100,000 or less.

The moisture concentration in the binder is preferably 100 ppm or less on a mass basis.

The metal concentration in the binder is preferably 100 ppm or less on a mass basis.

The electrode material may contain one kind of binder alone, or two or more kinds of binders.

In a case where the electrode material contains a binder, the content of the binder is preferably 0.01 mass % or more, more preferably 0.1 mass % or more, and particularly preferably 1 mass % or more with respect to the total solid content mass of the electrode material from the viewpoint of reduction of interface resistance and maintaining of the reduction. The content of the binder is preferably 10 mass % or less, more preferably 5 mass % or less, and particularly preferably 3 mass % or less with respect to the total solid content mass of the electrode material from the viewpoint of battery performance.

In a case where the electrode material contains an electrode active material, an inorganic solid electrolyte, and a binder, a ratio of the total mass of the active material and the inorganic solid electrolyte to the mass of the binder ([mass of active material+mass of inorganic solid electrolyte]/[mass of the binder]) is preferably 1,000 to 1, more preferably 500 to 2, and particularly preferably 100 to 10.

Conductive Auxiliary Agent

The electrode material preferably contains a conductive auxiliary agent from the viewpoint of an improvement in electron conductivity of the active material. The conductive auxiliary agent is not limited, and known conductive auxiliary agents can be used. In particular, in a case where the electrode material contains a positive electrode active material, the electrode material preferably contains a conductive auxiliary agent.

Examples of the conductive auxiliary agent include graphite (for example, natural graphite and artificial graphite), carbon black (for example, acetylene black, Ketjen black, and furnace black), amorphous carbon (for example, needle coke), carbon fibers (for example, vapor-grown carbon fibers and carbon nanotubes), other carbonaceous materials (for example, graphene and fullerene), metal powders (for example, a copper powder and a nickel powder), metal fibers (for example, copper fibers and nickel fibers), and conductive polymers (for example, polyaniline, polypyrrole, polythiophene, polyacetylene, and polyphenylene derivatives).

Among the above examples, the conductive auxiliary agent is preferably at least one conductive auxiliary agent selected from the group consisting of carbon fibers and metal fibers.

Examples of the shape of the conductive auxiliary agent include a fibrous shape, an acicular shape, a tubular shape, a dumbbell shape, a disk shape, and an oval spherical shape. Among the above examples, the shape of the conductive auxiliary agent is preferably a fibrous shape from the viewpoint of an improvement in electron conductivity of the active material.

The aspect ratio of the conductive auxiliary agent is preferably 1.5 or more, and more preferably 5 or more. In a case where the aspect ratio of the conductive auxiliary agent is 1.5 or more, the electron conductivity of the electrode active material can be improved, and thus the output characteristics of the battery can be improved.

The aspect ratio of the conductive auxiliary agent is preferably 10,000 or less, more preferably 5,000 or less, and particularly preferably 1,000 or less. Furthermore, the aspect ratio of the conductive auxiliary agent is preferably 500 or less, more preferably 300 or less, and particularly preferably 100 or less. In a case where the aspect ratio of the conductive auxiliary agent is 10,000 or less, the dispersibility of the conductive auxiliary agent can be improved, and a short circuit due to the conductive auxiliary agent penetrating a formed body for an electrode can be efficiently prevented.

The aspect ratio of the conductive auxiliary agent is measured by the following method. SEM images of three optional visual fields taken at 1,000 to 3,000-fold observation magnification using a scanning electron microscope (SEM) (for example, XL30 manufactured by Koninklijke Philips N.V) are converted to bitmap (BMP) files. Images of 50 particles of the conductive auxiliary agent are imported using image analysis software (for example, "A-ZOKUN" that is an integrated application of IP-1000PC manufactured by Asahi Engineering Co., Ltd.). A maximum length and a minimum length of each of the particles of the conductive auxiliary agent are read in a state in which the particles of the conductive auxiliary agent are observed without being overlapped. The "maximum length of the conductive auxiliary agent" means the maximum length among distances from a certain point to another point on the outer circumference of the conductive auxiliary agent particle. The "minimum length of the conductive auxiliary agent" means shortest distance among line segments from a certain point to another point on the outer circumference of the conductive auxiliary agent particle, which are orthogonal to the line segment having the maximum value. An average (A) of 40 points excluding upper 5 points and lower 5 points among the maximum lengths (major axis lengths) of the 50 particles of the conductive auxiliary agent is obtained. Then, an average (B) of 40 points excluding upper 5 points and lower 5 points among the minimum lengths (minor axis lengths) of the 50 particles of the conductive auxiliary agent is obtained. The aspect ratio of the conductive auxiliary agent is calculated by dividing the average (A) by the average (B).

The minor axis length of the conductive auxiliary agent is preferably 10 µm or less, more preferably 8 µm or less, and particularly preferably 5 µm or less.

The minor axis length of the conductive auxiliary agent is preferably 1 nm or more, more preferably 3 nm or more, and particularly preferably 5 nm or more.

The minor axis length of the conductive auxiliary agent is the minimum length of each of 50 particles of the conductive auxiliary agent calculated in the method of measuring the aspect ratio of the conductive auxiliary agent.

The average minor axis length of the conductive auxiliary agent is preferably 8 µm or less, more preferably 5 µm or less, and particularly preferably 3 µm or less.

The average minor axis length of the conductive auxiliary agent is preferably 1 nm or more, more preferably 2 nm or more, and particularly preferably 3 nm or more.

The average minor axis length of the conductive auxiliary agent is an average of the minor axis lengths of the particles of the conductive auxiliary agent, excluding upper 10% and lower 10% of the minimum lengths (minor axis lengths) of 50 particles of the conductive auxiliary agent calculated in the method of measuring the aspect ratio of the conductive auxiliary agent.

The electrode material may contain one kind of conductive auxiliary agent alone, or two or more kinds of conductive auxiliary agents.

In a case where the electrode material contains a conductive auxiliary agent, the content of the conductive auxiliary agent is preferably more than 0 mass % and 10 mass % or less, more preferably 0.5 mass % to 8 mass %, and particularly preferably 1 mass % to 7 mass % with respect to the total solid content mass of the electrode material from the viewpoint of an improvement in electron conductivity of the active material.

Lithium Salt

The electrode material preferably contains a lithium salt from the viewpoint of an improvement in battery performance. The lithium salt is not limited, and known lithium salts can be used.

As the lithium salt, the lithium salts described in paragraphs 0082 to 0085 of JP2015-088486A are preferable.

The electrode material may contain one kind of lithium salt alone, or two or more kinds of lithium salts.

In a case where the electrode material contains a lithium salt, the content of the lithium salt is preferably 0.1 mass % to 15 mass % with respect to the total solid content mass of the electrode material.

Dispersant

The electrode material preferably contains a dispersant. In a case where the electrode material contains a dispersant, it is possible to suppress the aggregation of either the electrode active material or the inorganic solid electrolyte in a case where the concentration of any one of the electrode active material or the inorganic solid electrolyte is high.

The dispersant is not limited, and known dispersants can be used. The dispersant is preferably a compound formed of low molecules of a molecular weight of 200 or more and less than 3,000 or oligomers, and having a functional group represented by the following functional group Group (I) and an alkyl group having 8 or more carbon atoms or an aryl group having 10 or more carbon atoms in the same molecule.

The functional group Group (I) is at least one functional group selected from the group consisting of an acidic group, a group having a basic nitrogen atom, a (meth)acryloyl group, a (meth)acrylamide group, an alkoxysilyl group, an epoxy group, an oxetanyl group, an isocyanate group, a cyano group, and a sulfanyl group, and a hydroxy group, preferably at least one functional group selected from the group consisting of an acidic group, a group having a basic nitrogen atom, an alkoxysilyl group, a cyano group, a sulfanyl group, and a hydroxy group, and more preferably at least one functional group selected from the group consisting of a carboxy group, a sulfonic acid group, a cyano group, an amino group, and a hydroxy group.

The electrode material may contain one kind of dispersant alone, or two or more kinds of dispersants.

In a case where the electrode material contains a dispersant, the content of the dispersant is preferably 0.2 mass % to 10 mass %, and more preferably 0.5 mass % to 5 mass % with respect to the total solid content mass of the electrode material from the viewpoint that both the prevention of aggregation and the battery performance are achieved.

Liquid Component

The electrode material may contain a liquid component. Examples of the liquid component include an electrolytic solution.

The electrolytic solution is not limited, and known electrolytic solutions can be used. Examples of the electrolytic solution include an electrolytic solution containing an electrolyte and a solvent. Specific examples of the electrolytic solution include an electrolytic solution containing a lithium salt compound as an electrolyte and a carbonate compound as a solvent.

Examples of the lithium salt compound include lithium hexafluorophosphate. The electrolytic solution may contain one kind of lithium salt compound alone, or two or more kinds of lithium salt compounds.

Examples of the carbonate compound include ethyl methyl carbonate, ethylene carbonate, and propylene carbonate. The electrolytic solution may contain one kind of carbonate compound alone, or two or more kinds of carbonate compounds.

Examples of the electrolyte contained in the electrolytic solution include the materials described in the above section "Inorganic Solid Electrolyte".

As the component of the electrolytic solution, for example, an ionic liquid may be used. The ionic liquid may be used as an electrolyte or a solvent.

The content of the electrolytic solution in the electrode material is preferably 30 mass % or less, more preferably 20 mass % or less, and particularly preferably 15 mass % or less with respect to the total mass of the electrode material. In a case where the content of the electrolytic solution in the electrode material is 30 mass % or less, it is possible to suppress the oozing of the electrolytic solution during the forming of the electrode material.

The content of the electrolytic solution in the electrode material is preferably 0.01 mass % or more, and more preferably 0.1 mass % or more with respect to the total mass of the electrode material from the viewpoint of an improvement in battery performance.

The electrode material may contain, as a liquid component, a solvent other than the solvent contained as a component of the electrolytic solution (hereinafter, also simply referred to as "solvent"). Examples of the solvent include alcohol compound solvents, ether compound solvents, amide compound solvents, amino compound solvents, ketone compound solvents, aromatic compound solvents, aliphatic compound solvents, and nitrile compound solvents.

Examples of the alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound solvents include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, and diethylene glycol monobutyl ether), dimethyl ether, diethyl ether, diisopropyl ether, dibutyl ether, tetrahydrofuran, and dioxane.

Examples of the amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N,N-methylacetamide, N,N-dimethylacetamide, N-methylpropanamide, and hexamethylphosphoric triamide.

Examples of the amino compound solvents include triethylamine, diisopropylethylamine, and tributylamine.

Examples of the ketone compound solvents include acetone, methyl ethyl ketone, methyl isobutyl ketone, and cyclohexanone.

Examples of the aromatic compound solvents include benzene, toluene, xylene, and the like.

Examples of the aliphatic compound solvents include hexane, heptane, octane, and decane.

Examples of the nitrile compound solvents include acetonitrile, propionitrile, and isobutyronitrile.

The solvent is preferably at least one solvent selected from the group consisting of a nitrile compound solvent, an aromatic compound solvent, and an aliphatic compound solvent, more preferably at least one solvent selected from the group consisting of isobutyronitrile, toluene, and heptane, and particularly preferably at least one solvent selected from the group consisting of toluene and heptane.

The boiling point of the solvent is preferably 50° C. or higher, and more preferably 70° C. or higher at normal pressure (1 atm). The boiling point of the solvent is preferably 250° C. or lower, and more preferably 220° C. or lower at normal pressure (1 atm).

The electrode material may contain one kind of solvent alone, or two or more kinds of solvents.

The content of the solvent (including the solvent contained as a component of the electrolytic solution, and this is the same in this paragraph) in the electrode material is preferably 30 mass % or less, more preferably 20 mass % or less, and particularly preferably 15 mass % or less with respect to the total mass of the electrode material. In a case where the content of the solvent in the electrode material is 30 mass % or less, it is possible to suppress the deterioration of battery performance, and it is possible to suppress the oozing of the solvent during the forming of the electrode material. The lower limit of the content of the solvent in the electrode material is not limited. The content of the solvent in the electrode material may be 0 mass % or more, or may exceed 0 mass %.

The content of the liquid component in the electrode material is preferably 30 mass % or less, more preferably 20 mass % or less, and particularly preferably 15 mass % or less with respect to the total mass of the electrode material. In a case where the content of the liquid component in the electrode material is 30 mass % or less, it is possible to suppress the oozing of the liquid component during the forming of the electrode material. In addition, in a case where the liquid component contains a solvent, it is possible to suppress the deterioration of battery performance. The lower limit of the content of the liquid component in the electrode material is not limited. The content of the liquid component in the electrode material may be 0 mass % or more, or may exceed 0 mass %.

As the electrode material, for example, the following materials can also be used in addition to the above materials.

(1) The granulated body described in paragraphs 0029 to 0037 of JP2017-104784A (2) The positive electrode mixture paint described in paragraph 0054 of JP2016-059870A (3) The composite particles described in paragraphs 0017 to 0070 of JP2016-027573A (4) The composite particles described in paragraphs 0020 to 0033 of JP6402200B (5) The electrode composition described in paragraphs 0040 to 0065 of JP2019-046765A (6) The materials (for example, active material, positive electrode slurry, and negative electrode slurry) described in paragraphs 0080 to 0114 of JP2017-054703A (7) The powder described in JP2014-198293A (8) The active material, binder, and composite particles described in paragraphs 0024 to 0025, 0028, and 0030 to 0032 of JP2016-062654A (Electrode Material Preparation Method)

The electrode material can be prepared as necessary by, for example, mixing the electrode active material with the above-described optional components other than the electrode active material. Examples of the mixing method include a method using a ball mill, a beads mill, a planetary mixer, a blade mixer, a roll mill, a kneader, or a disk mill.

Next, embodiments (first to fifth embodiments) of the method of manufacturing a formed body for an electrode according to the present disclosure will be specifically described with reference to the drawings.

First Embodiment

The method of manufacturing a formed body for an electrode according to a first embodiment of the present disclosure will be described with reference to FIG. 1.

FIG. 1 shows a schematic configuration view showing a schematic configuration of a powder forming apparatus 100 used for manufacturing a formed body for an electrode.

The powder forming apparatus 100 shown in FIG. 1 comprises a pair of transport belts 11, a deposition belt 21 onto which the electrode material 15 is transferred from the pair of transport belts 11, a supplying belt 31 which introduces the electrode material 15 to a gap between the pair of transport belts 11, and a supply feeder 41 which supplies an electrode material to the supplying belt 31.

The pair of transport belts 11 includes two transport belt 11a and transport belt 11b placed at positions that are in a mirror image relationship with each other about a central axis C parallel to the direction of antigravitational force. That is, in FIG. 6, the inclination angle θ1=the inclination angle θ2. The present embodiment is an aspect in which the electrode material falls on the central axis C as shown in FIG. 1.

The transport belt 11a is wound around the two rolls 16 and 17, and can travel along with the rolls rotating in the direction of the arrow.

The transport belt 11b is wound around two rolls 18 and 19, and can travel along with the rolls rotating in the direction of the arrow.

By providing the transport belt 11a and the transport belt 11b, the electrode material to be introduced can be received between the transport belt 11a and the transport belt 11b, and can be sandwiched between the transport belt 11a and the other transport belt 11b. The electrode material is belt-transported while being sandwiched between the transport belt 11a and the transport belt 11b. Then, during belt transfer, the electrode material is pressurized by the transport belt 11a and the transport belt 11b, and as the electrode material is transferred to a downstream portion in the belt transport direction, the pressure applied to the electrode material gradually increases.

The deposition belt 21 is placed downstream portion of the V-shaped transport belt 11 in the electrode material transport direction. The deposition belt 21 is wound around two main rolls, and three support rolls for supporting the belt at a predetermined position are placed between the two main rolls.

The deposition belt 21 is placed at a certain distance from the pair of transport belts 11, and a configuration is made such that the thickness of a film of the electrode material to be deposited is regulated by the roll 17 of the transport belt 11a and the deposition belt 21.

Conventionally, there is known a technique of using two transport belts placed in parallel with each other and simply pressurizing the powder introduced between the two transport belts to form a sheet. In the pair of transport belts 11 in the present disclosure, the two transport belts 11a and 11b are placed at positions forming a V shape about the central axis C parallel to the direction of antigravitational force in the side view. That is, the transport belt 11a and the transport belt 11b forming the pair of transport belts 11 are in a relationship close to a mirror image with respect to the central axis C in the side view, and the mirror image is V-shaped. Since the two transport belts are placed in a V shape, in the second step of the present disclosure, it is easy to catch the dropped electrode material in the gap opened in the V shape. Further, in the second step of the present disclosure, by adjusting the gap between the two transport belts by changing the roll placement or the like, the transport amount of the electrode material temporarily received between the pair of transport belts and to be belt-transported is reduced to a desired amount and the electrode material can be uniformized in the belt transport direction.

Further, the electrode material is supplied in the belt transport direction through a V-shaped gap that gradually narrows in the belt transport direction. As a result, the pressure applied to the electrode material gradually increases as it is transported in the transport direction, and the mass distribution of the electrode material transported downstream portion can be suppressed to a small size. As a result, pulsation due to the mass distribution of the electrode material before being transferred to the deposition belt is unlikely to occur.

As described above, in the present disclosure, the uniformity of the mass distribution of the electrode material transferred to the deposition belt 21 after pressurization of the electrode material in the belt width direction orthogonal to the transport direction is increased.

As shown in FIGS. 1 and 6, for example, the two transport belt 11a and the transport belt 11b forming the pair of transport belts 11 may be a first belt 11a in which a movement direction of the transport surface in the transport passage through which the electrode material 15 is transported is inclined to one direction (the right direction in FIGS. 1 and 6) of left-right directions with respect to a direction of antigravitational force (central axis C) with an inclination angle $\theta 1$ of $0° < \theta 1 \leq 60°$ in a side view, and a second belt 11b in which the movement direction of the transport surface in the transport passage through which the electrode material 15 is transported is inclined to the other direction (the left direction in FIGS. 1 and 6) in the left-right directions with respect to the direction of antigravitational force (central axis C) with an inclination angle $\theta 2$ of $0° < \theta 2 \leq 60°$ in a side view.

The supplying belt 31 is placed upstream portion of the V-shaped transport belt 11 in the electrode material transport direction. In a case of introducing the electrode material into the gap of the transport belt 11, the electrode material previously supplied to the supplying belt 31 can be dropped from the supplying belt 31 and introduced into the gap opened in the V shape of the transport belt 11.

The supply feeder 41 is a supply device that supplies the electrode material onto the supplying belt 31. The supply feeder 41 may apply the electrode material onto the supplying belt 31 in a fixed amount, and particularly from the viewpoint of reducing the mass distribution of the electrode material in the belt width direction orthogonal to the belt traveling direction of the supplying belt, it is preferable to apply a fixed amount of the electrode material in the belt width direction.

An aspect in which instead of the supply feeder 41, another supply device is placed may be adopted.

A leveling roll 51 for further leveling the deposited electrode material is placed on the deposition belt 21. The electrode material 15 can be leveled by bringing the electrode material 15 into contact with the leveling roll 51 while transporting the electrode material 15 in the transport direction (direction of arrow B) by the deposition belt 21.

The leveling roll may be surface-treated. Examples of the surface treatment include silicone coating and fluorine coating.

In a case where the powder forming apparatus 100 shown in FIG. 1 is started, the electrode material 15 (hereinafter, also referred to as "powder 15") which is powder is supplied from the supply feeder 41 to the supplying belt 31. The supply feeder 41 temporarily applies the powder 15 onto the supplying belt 31 with a certain degree of uniformity so that the mass distribution of the powder 15 is not significantly disturbed in the belt width direction of the supplying belt. The powder 15 applied on the supplying belt 31 is transported to the downstream end portion by the supplying belt 31, falls at the downstream end portion of the supplying belt 31, and is introduced into the pair of transport belts 11. The introduced powder 15 is sandwiched between the transport belt 11a, which is the first belt, and the transport belt 11b, which is the second belt, and is transported, and receives a gradual increase in pressure as it is transported. Then, pressurizing is performed to reach a desired pressure between the rolls 17 and 19 located downstream portion of the pair of transport belts 11.

In this manner, the desired pressure is applied to the powder 15 that has been uniformized through the pair of transport belts 11, therefore, the mass distribution of the film-shaped electrode material obtained after pressurization can be made small. After a desired pressure is applied to the electrode material, it is transferred to the deposition belt 21 and transported in the transport direction (direction of arrow B) by the deposition belt 21.

The belt transportation speed of the transport belt 11a (first belt) and the transport belt 11b (second belt) in the pair of transport belts 11 is preferably lower than the belt transportation speed of the deposition belt 21. As a result, the electrode material can be easily supplied in the transport direction (direction of arrow B) of the deposition belt 21, and the uniformity of the mass distribution of the film-shaped electrode material is further improved.

Second Embodiment

Next, the method of manufacturing a formed body for an electrode according to a second embodiment of the present disclosure will be described with reference to FIG. 2.

The second embodiment is the same as the first embodiment except that, in the first embodiment, a plurality of supply feeders are placed and a uniformizing roll, which is an example of a uniformizing member, is newly placed in the transport passage of the electrode material of the supplying belt 31.

FIG. 2 shows a schematic configuration view showing a schematic configuration of a powder forming apparatus 200 used for manufacturing a formed body for an electrode. The same components as those in the first embodiment are designated by the same references, and the description of the references will be omitted.

The powder forming apparatus 200 shown in FIG. 2 comprises a pair of transport belts 11, a deposition belt 21 on which the powder 15 is transferred from the pair of transport belts 11, a supplying belt 31 which introduces the powder 15 to a gap between the pair of transport belts 11, a plurality of supply feeders 41 which supply an electrode material to the supplying belt 31, and a uniformizing roll 53 placed in the transport passage of the electrode material of the supplying belt 31.

The plurality of supply feeders 41 may be placed in the belt width direction orthogonal to the belt traveling direction of the supplying belt 31. By placing the plurality of supply feeders 41 in the belt width direction, it becomes easy to control the mass distribution of the electrode material in the belt width direction to be small.

The plurality of supply feeders 41 may be placed at equal intervals in the belt width direction.

As the plurality of supply feeders 41, a plurality of supply feeders having the same outlet may be used, or supply feeders having different outlets may be used in combination.

The uniformizing roll 53 is placed in a transport passage through which the electrode material of the supplying belt 31 is transported.

The uniformizing roll 53 is a roll or the like having a plurality of projecting structures on the roll surface, and uniformizes a bias of the non-uniform electrode material existing on the supplying belt 31 and levels the mass distribution of the electrode material before being introduced into the pair of transport belts 11.

Also in the second embodiment, it is preferable that the belt transportation speed of the transport belt 11a (first belt) and the transport belt 11b (second belt) in the pair of transport belts 11 is lower than the belt transportation speed of the deposition belt 21. As a result, the electrode material can be easily supplied in the transport direction (direction of arrow B) of the deposition belt 21, and the uniformity of the mass distribution of the film-shaped electrode material is further improved.

Third Embodiment

Next, the method of manufacturing a formed body for an electrode according to a third embodiment of the present disclosure will be described with reference to FIG. 3.

The third embodiment is the same example as the first embodiment except that, in the first embodiment, the long first support member is continuously supplied to the transport surface (material transport surface), which transports the electrode material, of the second belt of the pair of transport belts and the deposition surface of the deposition belt and the electrode material is deposited on the first support member.

Figure 3:
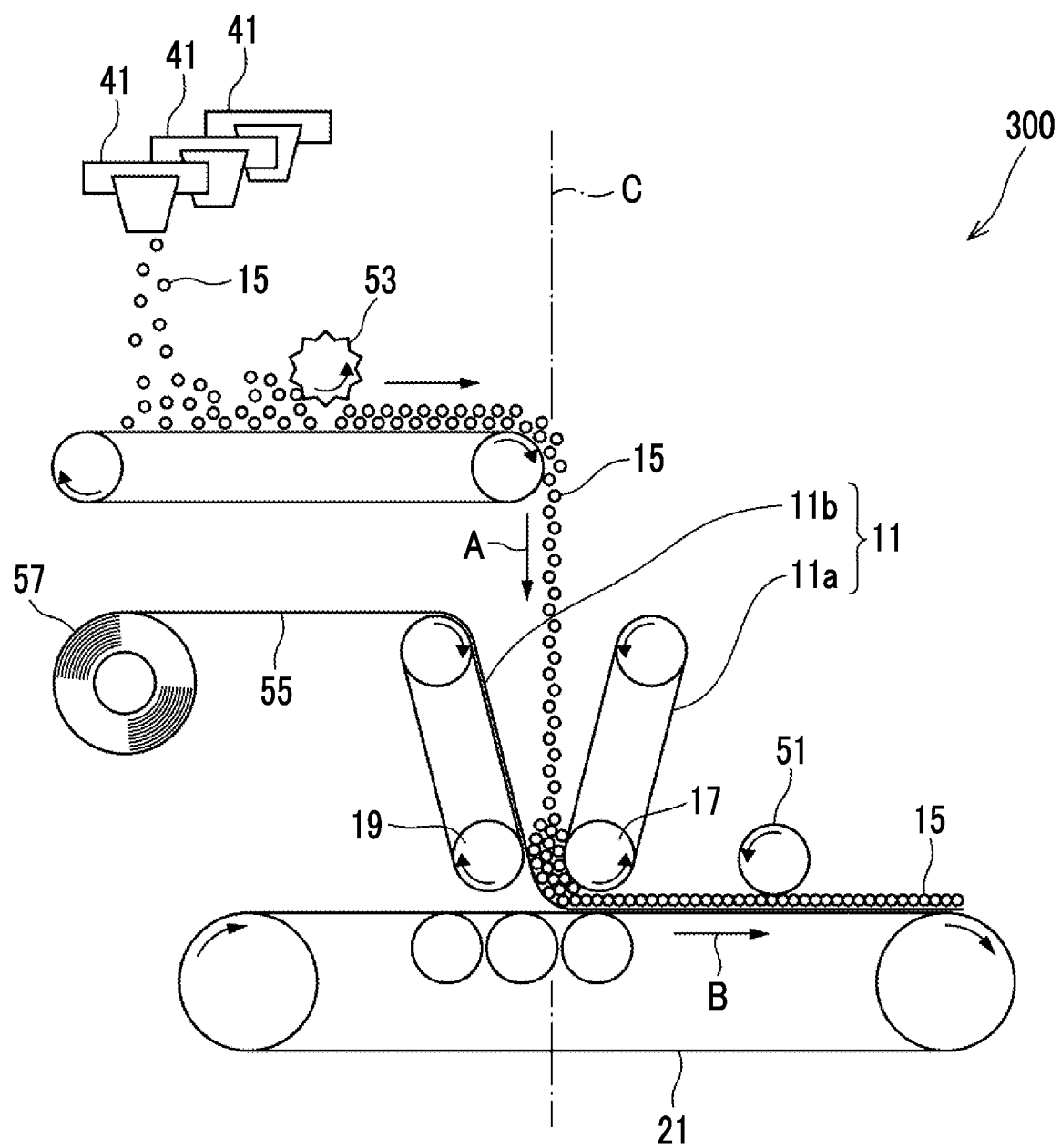
FIG. 3 shows a schematic view showing a third embodiment of a method of manufacturing a formed body for an electrode according to the present disclosure.

FIG. 3 shows a schematic configuration view showing a schematic configuration of a powder forming apparatus 300 used for manufacturing a formed body for an electrode. The same components as those in the first and second embodiments and the second embodiment are designated by the same references, and the description of the references will be omitted.

The powder forming apparatus 300 shown in FIG. 3 comprises a pair of transport belts 11, a deposition belt 21 on which the powder 15 is transferred from the pair of transport belts 11, a supplying belt 31 which introduces the powder 15 to a gap between the pair of transport belts 11, a plurality of supply feeders 41 which supply an electrode material to the supplying belt 31, a uniformizing roll 53 placed in the transport passage of the supplying belt 31, and a collector roll 57.

In a case where the powder forming apparatus 300 shown in FIG. 3 is started, the powder 15 is supplied from the plurality of supply feeders 41 in the first step of the present disclosure, and the supplied powder 15 falls at the downstream end portion of the supplying belt 31 in the subsequent second step in the same manner as in the second embodiment, and is introduced into the pair of transport belts 11.

On the other hand, a collector 55 unwound from the collector roll 57 around which a collector, which is an example of the long first support member, is wound is continuously supplied to the material transport surface (that is, the transport surface which transports the electrode material) of the transport belt 11b which is the second belt.

In this case, the powder 15 introduced into the pair of transport belts 11 is introduced into the gap between the transport belt 11a, which is the first belt, and the collector 55, which is sent onto the transport belt 11b, which is the second belt.

Then, in the next second step, the introduced powder 15 is sandwiched between the transport belt 11a and the collector 55, and is transported, and receives a pressure that gradually increases as it is transported. Then, pressurizing is performed to reach a desired pressure between the rolls 17 and 19 located downstream portion of the pair of transport belts 11. In this manner, the desired pressure is applied to the powder 15 that has been uniformized through the pair of transport belts 11, therefore, the mass distribution of the film-shaped electrode material obtained after pressurization can be made small. After the desired pressure is applied to the electrode material, the electrode material is transferred to the deposition belt 21 in the third step of the present disclosure, and is transported in the transport direction (direction of arrow B) by the deposition belt 21.

In the above, the case where the collector is used as the first support member has been described, but another first support member such as a release material can be used instead of the collector.

In the third embodiment, the relationship of the belt transportation speed between the transport belt 11a (first belt) and the transport belt 11b (second belt) in the pair of transport belts 11, and the deposition belt 21 is preferably set in which the belt transportation speed of the transport belt 11b (second belt) is equal to the belt transportation speed of the deposition belt 21, and the belt transportation speed of the transport belt 11a (first belt) is lower than the belt transportation speed of the transport belt 11b (second belt) and the deposition belt 21. As a result, the electrode material can be easily supplied in the transport direction (direction of arrow B) of the deposition belt 21, and the uniformity of the mass distribution of the film-shaped electrode material is further improved.

Fourth Embodiment

Next, the method of manufacturing a formed body for an electrode according to a fourth embodiment of the present disclosure will be described with reference to FIG. 4.

The fourth embodiment is the same example as the first embodiment except that, in the first embodiment, the long first support member is continuously supplied to the transport surface (material transport surface), which transports the electrode material, of the second belt of the pair of transport belts and the deposition surface of the deposition belt and long second support member is continuously supplied onto the transport surface (material transport surface), which transports the electrode material, of the first belt of the pair of transport belts and the electrode material transferred onto the deposition belt, thereby depositing the electrode material between the first support member and the second support member.

Figure 4:
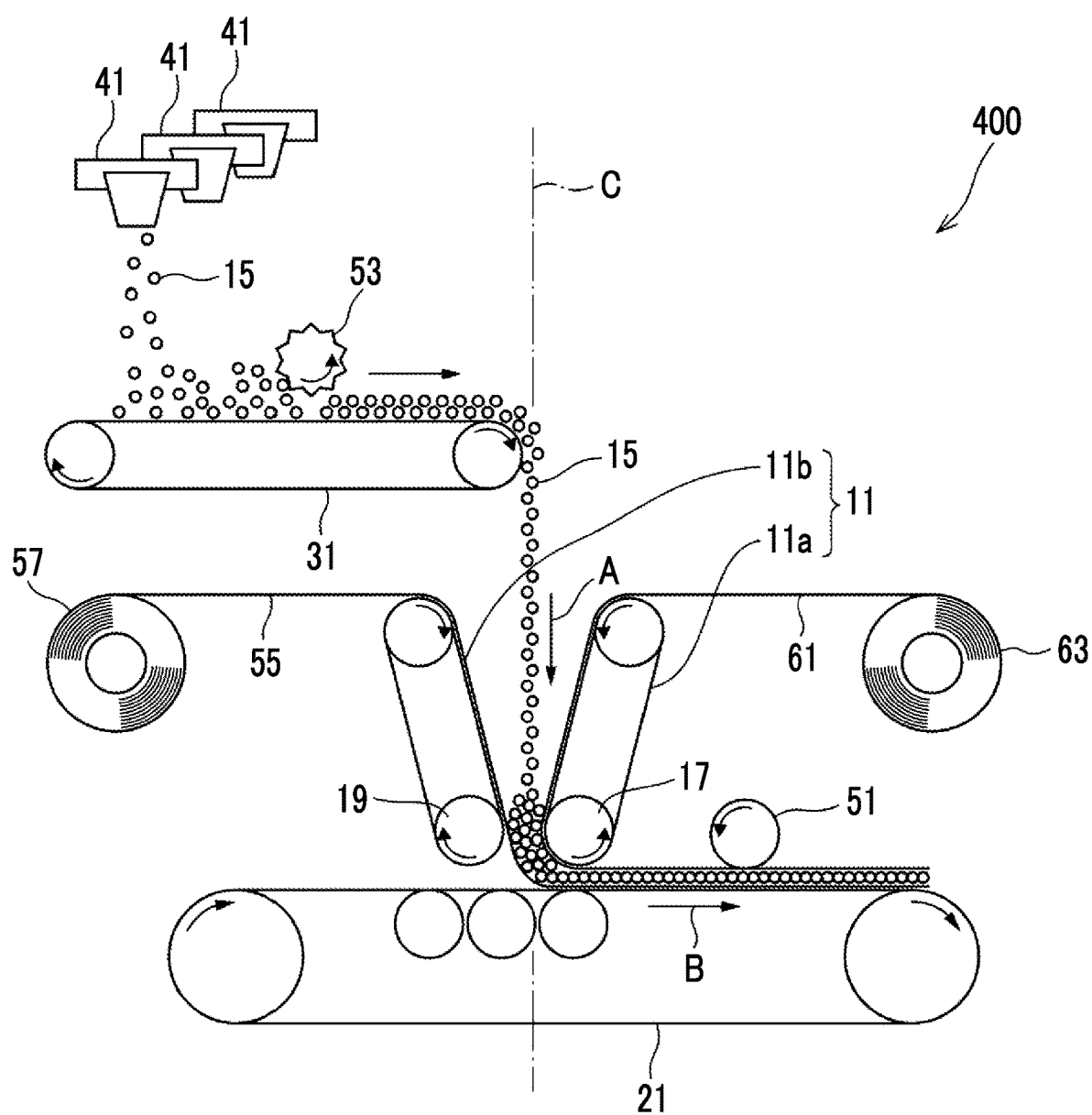
FIG. 4 shows a schematic view showing a fourth embodiment of a method of manufacturing a formed body for an electrode according to the present disclosure.

FIG. 4 shows a schematic configuration view showing a schematic configuration of a powder forming apparatus 400 used for manufacturing a formed body for an electrode. The same components as those in the first and second embodiments and the second embodiment are designated by the same references, and the description of the references will be omitted.

The powder forming apparatus 400 shown in FIG. 4 comprises a pair of transport belts 11, a deposition belt 21 on which the powder 15 is transferred from the pair of transport belts 11, a supplying belt 31 which introduces the powder 15 to a gap between the pair of transport belts 11, a plurality of supply feeders 41 which supply an electrode material to the supplying belt 31, a uniformizing roll 53 placed in the transport passage of the supplying belt 31, a collector roll 57, and a release material roll 63.

In a case where the powder forming apparatus 400 shown in FIG. 4 is started, the powder 15 is supplied from the plurality of supply feeders 41 in the first step of the present disclosure, and the supplied powder 15 falls at the downstream end portion of the supplying belt 31 in the subsequent second step in the same manner as in the second embodiment, and is introduced into the pair of transport belts 11.

On the other hand, the collector 55 unwound from the collector roll 57 around which a collector, which is the long first support member, is wound is continuously supplied to the material transport surface (that is, the transport surface which transports the electrode material) of the transport belt 11b which is the second belt (first support member supply step).

On the other hand, the release material 61 unwound from the release material roll 63 around which the release material, which is an example of the long second support member, is wound is continuously supplied to the material transport surface of the transport belt 11a, which is the first belt (that is, the transport surface which transports the electrode material) (second support member supply step A).

In this case, the powder 15 introduced into the pair of transport belts 11 is introduced into the gap between release material 61 sent onto the transport belt 11a and the collector 55, which is sent onto the transport belt 11b.

Then, in the next second step, the introduced powder 15 is sandwiched between the release material 61 and the collector 55, and is transported, and receives a pressure that gradually increases as it is transported. Then, pressurizing is performed to reach a desired pressure between the rolls 17 and 19 located downstream portion of the pair of transport belts 11. In this manner, the desired pressure is applied to the powder 15 that has been uniformized through the pair of transport belts 11, therefore, the mass distribution of the film-shaped electrode material obtained after pressurization can be made small. After the desired pressure is applied to the electrode material, the electrode material is transferred to the deposition belt 21 in the third step of the present disclosure, and is transported in the transport direction (direction of arrow B) by the deposition belt 21.

In the above, the case where the collector is used as the first support member and the release material is used as the second support member has been described, but the present invention is not limited thereto.

For the first support member, another first support member such as a release material can be used instead of the collector, and for the second support member, another second support member such as a collector can be used instead of the release material. Further, the same member may be used for the first support member and the second support member, and for example, a release material may be used for both the first support member and the second support member.

In the fourth embodiment, the relationship of the belt transportation speed between the transport belt 11a (first belt) and the transport belt 11b (second belt) in the pair of transport belts 11, and the deposition belt 21 is preferably set in which the belt transportation speed of the transport belt 11b (second belt) is equal to the belt transportation speed of the deposition belt 21, and the belt transportation speed of the transport belt 11a (first belt) is lower than the belt transportation speed of the transport belt 11b (second belt) and the deposition belt 21. As a result, the electrode material can be easily supplied in the transport direction (direction of arrow B) of the deposition belt 21, and the uniformity of the mass distribution of the film-shaped electrode material is further improved.

Fifth Embodiment

Next, the method of manufacturing a formed body for an electrode according to a fifth embodiment of the present disclosure will be described with reference to FIG. 5.

The fifth embodiment is the same example as the first embodiment except that, in the first embodiment, the long second support member is continuously supplied onto the transport surface (material transport surface), which transports the electrode material, of the first belt of the pair of transport belts and electrode material transferred onto the deposition belt in the second step and a long third support member is continuously supplied onto the deposition surface of the deposition belt in the third step, thereby depositing the electrode material between the second support member and the third support member.

Figure 5:
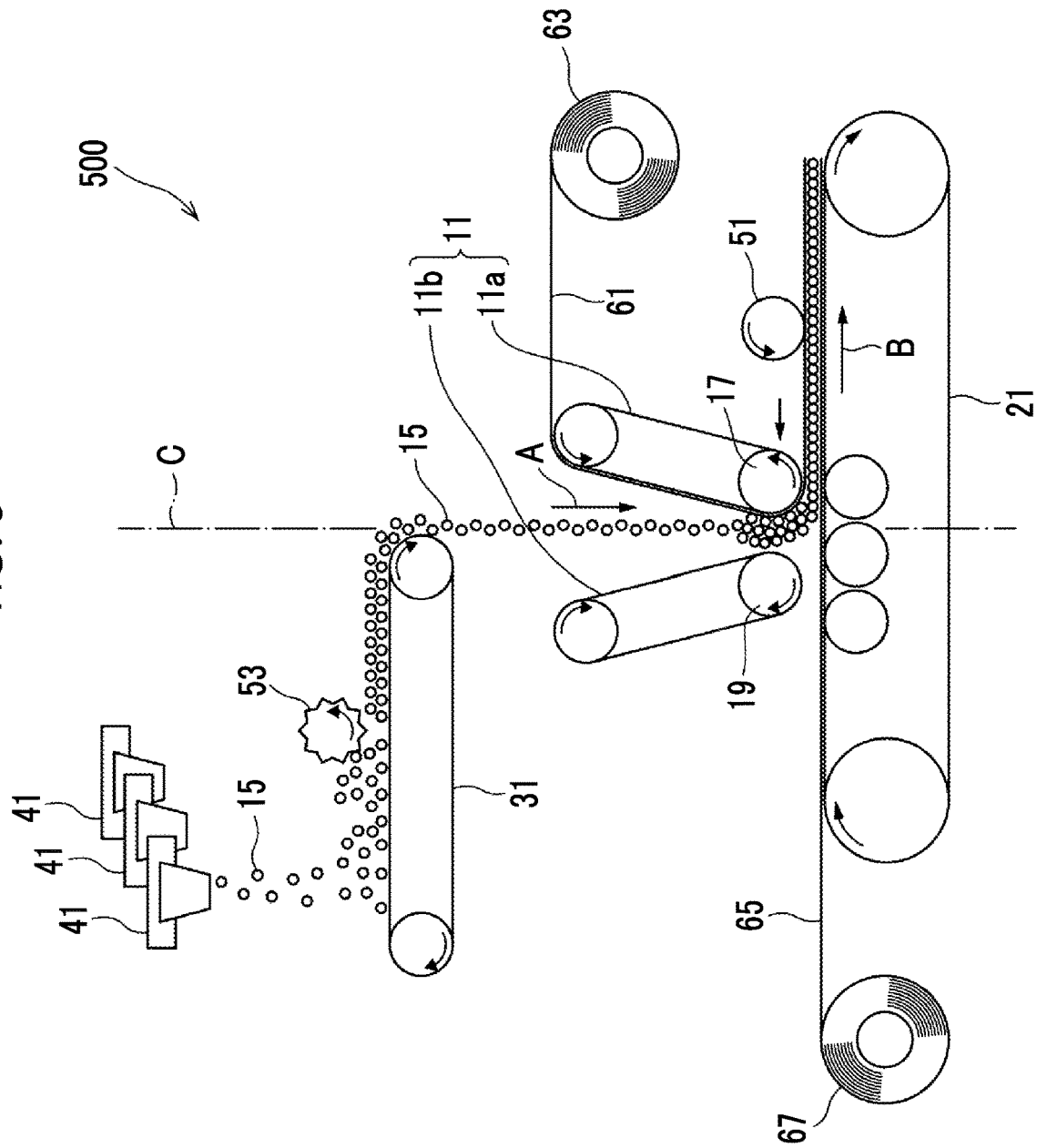
FIG. 5 shows a schematic view showing a fifth embodiment of a method of manufacturing a formed body for an electrode according to the present disclosure.

FIG. 5 shows a schematic configuration view showing a schematic configuration of a powder forming apparatus 500 used for manufacturing a formed body for an electrode. The same components as those in the first and second embodiments and the second embodiment are designated by the same references, and the description of the references will be omitted.

The powder forming apparatus 500 shown in FIG. 5 comprises a pair of transport belts 11, a deposition belt 21 on which the powder 15 is transferred from the pair of transport belts 11, a supplying belt 31 which introduces the powder 15 to a gap between the pair of transport belts 11, a plurality of supply feeders 41 which supply an electrode material to the supplying belt 31, a uniformizing roll 53 placed in the transport passage of the supplying belt 31, a release material roll 63, and a collector roll 67.

In a case where the powder forming apparatus 500 shown in FIG. 5 is started, the powder 15 is supplied from the plurality of supply feeders 41 in the first step of the present disclosure, and the supplied powder 15 falls at the downstream end portion of the supplying belt 31 in the subsequent second step in the same manner as in the second embodiment, and is introduced into the pair of transport belts 11.

On the other hand, the release material 61 unwound from the release material roll 63 around which the release material, which is an example of the long second support member, is wound is continuously supplied to the material transport surface of the transport belt 11a, which is the first belt (that is, the transport surface which transports the electrode material) (second support member supply step B).

On the other hand, a collector 65 unwound from the collector roll 67 around which a collector, which is an example of the long third support member, is wound is continuously supplied to the deposition surface (that is, a surface on which the electrode material is deposited) of the deposition belt (third support member supply step).

Then, in the next second step, the introduced powder 15 is sandwiched between the release material 61 and the transport belt 11b, which is the second belt, and is transported, and receives a pressure that gradually increases as it is transported. Then, pressurizing is performed to reach a desired pressure between the rolls 17 and 19 located downstream portion in the transport direction for the electrode material in the pair of transport belts 11. In this manner, the desired pressure is applied to the powder 15 that has been uniformized through the pair of transport belts 11, therefore, the mass distribution of the film-shaped electrode material obtained after pressurization can be made small.

After the desired pressure is applied to the electrode material, in the third step of the present disclosure, the electrode material formed into a film by applying the desired pressure is transferred to a surface of the collector 65 continuously supplied onto the deposition belt 21 while being in contact with the second support member. Then, the film-shaped electrode material and the collector 65 are transported to the transport direction (direction of arrow B) by the deposition belt 21.

In the above, the case where the release material is used as the second support member and the collector is used as the third support member has been described, but the present invention is not limited thereto.

For the second support member, another second support member such as a collector can be used instead of the release material, and for the third support member, another third support member such as a release material can be used instead of the collector. Further, the same member may be used for the second support member and the third support member, and for example, a release material may be used for both the second support member and the third support member.

In the fifth embodiment, the relationship of the belt transportation speed between the transport belt 11a (first belt) and the transport belt 11b (second belt) in the pair of transport belts 11, and the deposition belt 21 is preferably set in which the belt transportation speed of the transport belt 11b (second belt) is equal to the belt transportation speed of the deposition belt 21, and the belt transportation speed of the transport belt 11a (first belt) is lower than the belt transportation speed of the transport belt 11b (second belt) and the deposition belt 21. As a result, the electrode material can be easily supplied in the transport direction (direction of arrow B) of the deposition belt 21, and the uniformity of the mass distribution of the film-shaped electrode material is further improved.

EXAMPLES

Hereinafter, the present invention will be described in more detail with reference to Examples, but the present invention is not limited to the following Examples as long as the gist of the present invention is not exceeded.

Example 1

Preparation of Electrode Material (P-1) for Positive Electrode

An electrode material (P-1) for a positive electrode was prepared according to the following procedure (preparation step).

Preparation of Sulfide-Based Inorganic Solid Electrolyte (Li—P—S-based glass)

A sulfide-based inorganic solid electrolyte was prepared with reference to "T. Ohtomo, A. Hayashi, M. Tatsumisago, Y. Tsuchida, S. Hama, K. Kawamoto, Journal of Power Sources, 233, (2013), pp. 231 to 235, and A. Hayashi, S. Hama, H. Morimoto, M. Tatsumisago, T. Minami, Chem. Lett., (2001), pp 872 to 873".

Specifically, in a glove box under an argon atmosphere (dew point of −70° C.), 2.42 g of lithium sulfide ($Li_2S$, manufactured by Sigma-Aldrich Inc., purity of >99.98%) and 3.9 g of diphosphorus pentasulfide ($P_2S_5$, manufactured by Sigma-Aldrich Inc., purity of >99%) were respectively weighed, and then the lithium sulfide and the diphosphorus pentasulfide were mixed for 5 minutes using an agate mortar. The molar ratio of $Li_2S$ to $P_2S_5$ ($Li_2S:P_2S_5$) was 75:25.

66 zirconia beads having a diameter of 5 mm were put in a 45 mL zirconia container (manufactured by Fritsch GmbH). Then, the entire amount of the mixture of the lithium sulfide and the diphosphorus pentasulfide was put therein, and then the container was completely sealed under an argon atmosphere. The container was mounted on a planetary ball mill P-7 (trade name) manufactured by Fritsch GmbH, and mechanical milling was performed for 20 hours at a temperature of 25° C. and a rotation speed of 510 rpm (revolutions per minute) to obtain 6.2 g of a yellow powder of a sulfide solid electrolyte material (Li—P—S-based glass). The above steps were repeated 100 times, and 620 g of a solid electrolyte material was obtained.

Preparation of Electrode Material (P-1) for Positive Electrode 180 zirconia beads having a diameter of 5 mm were put in a 45 mL zirconia container (manufactured by Fritsch GmbH), and then 3.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm (revolutions per minute). Next, 6.8 g of LCO (LiCoO$_2$, manufactured by Nippon Chemical Industrial CO., LTD.) as an active material and Li-100 (0.2 g) manufactured by Denka Company as a conductive auxiliary agent were put in the container. Then, the container was mounted on the planetary ball mill P-7, and mixing was performed for 10 minutes at a temperature of 25° C. and a rotation speed of 100 rpm to obtain the particulate electrode material (P-1) for a positive electrode. The above steps were repeated 100 times, and a required amount of a positive electrode material was obtained.

Production of Powder Sheet

The powder forming apparatus 100 shown in FIG. 1 was prepared, and the electrode material (P-1) for a positive electrode was put into a screw feeder, which is an example of the supply feeder 41, through a hopper.

The powder forming apparatus 100 was started, and the electrode material (P-1) for a positive electrode, which is an example of the electrode material (powder) 15, was jetted from the outlet of the screw feeder to the supplying belt 31. The electrode material (P-1) for a positive electrode jetted onto the supplying belt 31 is transported by the supplying belt 31 to the downstream end portion in the belt transport direction, is dropped from the downstream end portion of the supplying belt 31, and is thus introduced into the gap of the pair of transport belts (in the present example, referred to as "V-shaped transport belt") 11 (first step).

Here, the gap between the V-shaped transport belts is set as follows.

V-Shaped Transport Belt Setting

Inclination angle θ1 of transport belt 11a: 30°
Belt transportation speed of transport belt 11a: 5 m/min
Inclination angle θ2 of transport belt 11b: 30°
Belt transportation speed of transport belt 11b: 5 m/min
Transport surface-to-transport surface distance of the transport belt 11a and the transport belt 11b on the electrode material introduction port side: 50 mm
Transport surface-to-transport surface distance of the transport belt 11a and the transport belt 11b on the electrode material transfer port side: 500 μm
Transport surface-to-deposition surface distance between the transport belt 11a and the deposition belt 21: 500 μm As shown in FIG. 6, the transport surface-to-transport surface distance on the electrode material introduction port side refers to the shortest distance between a point P at which a line passing through the axial center of the roll 16 in the transport belt 11a and the material transport surface (outermost surface of the belt in the transport passage through which the electrode material is transported) of the transport belt 11a intersect perpendicularly in the side view and a point Q at which the line passing through the axial center of the roll 18 on the transport belt 11b and the material transport surface (outermost surface of the belt in the transport passage through which the electrode material is transported) of the transport belt 11b intersect perpendicularly in the side view.

As shown in FIG. 6, the transport surface-to-transport surface distance on the transfer port side of the electrode material refers to the shortest distance between a point R at which a line passing through the axial center of the roll 17 in the transport belt 11a and the material transport surface (outermost surface of the belt in the transport passage through which the electrode material is transported) of the transport belt 11a intersect perpendicularly in the side view and a point S at which the line passing through the axial center of the roll 19 on the transport belt 11b and the material transport surface (outermost surface of the belt in the transport passage through which the electrode material is transported) of the transport belt 11b intersect perpendicularly in the side view.

Also, as shown in FIG. 8, the transport surface-to-deposition surface distance between the transport belt 11a and the deposition belt 21 refers to a distance D where a length between a point T on the outermost surface of the transport passage, through which the electrode material is transported, in the deposition belt 21 and a point U where a normal, of the deposition belt, passing through the point T intersects the outermost surface of the transport belt 11a is the shortest in the side view.

The electrode material (P-1) for a positive electrode is sandwiched between the transport belt 11a, which is the first belt, and the transport belt 11b, which is the second belt, and a predetermined amount of the electrode material (P-1) for a positive electrode is sent toward the deposition belt 21 while pressurizing the electrode material (P-1) for a positive electrode by respective transport surfaces of the transport belt 11a and the transport belt 11b that travel with each other, and transferred to the deposition belt 21 (second to third steps).

Here, the amount of the electrode material (P-1) for a positive electrode determined in advance is adjusted by the screw feeder in the first step, the gap between the transport belt 11a and the transport belt 11b is adjusted in the second step, and the thickness of the electrode material transferred to the deposition belt 21 was controlled within a desired range. Further, also in the third step, the thickness of the electrode material transferred to the deposition belt 21 was controlled by adjusting the gap between the transport belt 11a and the deposition belt 21. The gap between the transport belt 11a and the transport belt 11b was determined by adjusting the transport surface-to-transport surface distance of the transport belt 11a and the transport belt 11b on the electrode material transfer port side. The gap between the transport belt 11a and the deposition belt 21 was determined by adjusting the transport surface-to-deposition surface distance between the transport belt 11a and the deposition belt 21.

In the above, the introduction amount of the electrode material (P-1) for a positive electrode introduced into the V-shaped transport belt 11 was set to be (temporarily) larger than the amount of the electrode material (P-1) for a positive electrode transferred from the V-shaped transport belt 11 to the deposition belt 21, and the electrode material (P-1) for a positive electrode introduced into the V-shaped transport belt 11 was temporarily stored in the V-shaped transport belt 11. Then, the temporarily stored electrode material (P-1) for a positive electrode was transported in a predetermined amount by the transport belt 11*a* and the transport belt 11*b* placed in a V shape, and was pressurized by gradually increasing the pressure. In this case, the electrode material (P-1) for a positive electrode was pressed with a linear pressure of 100 MPa between the rolls 17 and 19 located downstream portion in the transport direction of the positive electrode material in the V-shaped transport belt 11 to have a thickness of 500 µm. Thereafter, the electrode material (P-1) for a positive electrode which was pressurized in the form of a film is transferred onto the deposition belt 21 having a belt transportation speed of 5 m/min, and was transported to the transport direction (direction of arrow B) by the deposition belt 21.

As described above, long powder sheet in which the length in the width direction is 20 mm, the length in the longitudinal direction is 0.5 m, and the basis weight (target value) of the electrode material is 1.5 mg/cm' was obtained.

Example 2

A powder sheet was produced in the same manner as in Example 1, except that, in Example 1, the number of screw feeders was increased to two, and the two screw feeders were placed in parallel at two positions equidistant from both ends in the belt width direction, and an electrode material of 20 mm in the belt width direction was supplied from one outlet of the screw feeder through a hopper whose inside was divided into two.

Example 3

A powder sheet was produced in the same manner as in Example 1, except that, in Example 1, the number of screw feeders was increased to four, and the four screw feeders were placed in parallel at four positions at equal intervals in the belt width direction, and an electrode material of 20 mm in the belt width direction was supplied from one outlet of the screw feeder through a hopper whose inside was divided into four.

Example 4

A powder sheet was produced in the same manner as in Example 1, except that, in Example 1, the powder forming apparatus 200 shown in FIG. 2 in which the uniformizing roll 53 was placed in the transport passage of the supplying belt 31 of the powder forming apparatus 100 was prepared, and the electrode material (P-1) for a positive electrode which was jetted onto the supplying belt using the uniformizing roll was leveled.

Here, as the uniformizing roll, a 176100 50 mm spiral roll having a spiral structure on the outer circumference of the rotation shaft was used. By bringing the uniformizing roll into contact with the electrode material, the electrode material was moved in the peripheral direction and leveled.

Example 5

A powder sheet was produced in the same manner as in Example 1 except that, in Example 1, the gap of the V-shaped transport belt 11 was changed to the following setting.

V-Shaped Transport Belt Setting

Inclination angle θ1 of transport belt 11*a*: 45°
Inclination angle θ2 of transport belt 11*b*: 45°

Transport surface-to-transport surface distance of the transport belt 11*a* and the transport belt 11*b* on the electrode material introduction port side: 100 mm Here, the transport surface-to-transport surface distance on the electrode material introduction port side is the same as in the case of Example 1.

Transport surface-to-transport surface distance of the transport belt 11*a* and the transport belt 11*b* on the electrode material transfer port side: 500 µm Here, the transport surface-to-transport surface distance on the electrode material transfer port side is the same as in the case of Example 1.

Example 6

A powder sheet was produced in the same manner as in Example 1, except that, in Example 1, the powder forming apparatus 300 shown in FIG. 3 was prepared instead of the powder forming apparatus 100, a release paper unwound from the release paper roll around which long release paper (Grassine Direct type, manufactured by Lintec Corporation, thickness 60 µm; first support member) was wound was continuously supplied to the material transport surface (transport surface which transports the electrode material) of the transport belt 11*b*, which is the second belt of the V-shaped transport belt 11.

Example 7

A powder sheet was produced in the same manner as in Example 1, except that, in Example 1, the powder forming apparatus 400 shown in FIG. 4 was prepared instead of the powder forming apparatus 100, a release paper unwound from a release paper roll around which a long release paper (Grassine Direct type, manufactured by Lintec Corporation, thickness 60 µm; first support member) was wound was continuously supplied to the material transport surface (transport surface which transports the electrode material) of the transport belt 11*b* which is the second belt, of the V-shaped transport belt 11, and a release paper unwound from a release paper roll around which a long release paper (Grassine Direct type, manufactured by Lintec Corporation, thickness 60 µm; second support member) was wound was continuously supplied to the material transport surface (transport surface which transports the electrode material) of the transport belt 11*a* which is the first belt.

Example 8

A powder sheet was produced in the same manner as in Example 1, except that, in Example 1, the powder forming apparatus 400 shown in FIG. 4 was prepared instead of the powder forming apparatus 100, a collector unwound from a collector roll around which a long collector (aluminum foil having a thickness of 20 µm; first support member) was wound was continuously supplied to the material transport surface (transport surface which transports the electrode material) of the transport belt 11*b* which is the second belt, of the V-shaped transport belt 11, and a release paper unwound from a release paper roll around which a long release paper (Grassine Direct type, manufactured by Lintec Corporation, thickness 60 µm; second support member) was wound was continuously supplied to the material transport surface (transport surface which transports the electrode material) of the transport belt 11*a* which is the first belt.

Example 9

A powder sheet was produced in the same manner as in Example 8, except that, in Example 8, a long collector supplied to the material transport surface of the transport belt 11*b*, which is the second belt, was used instead of the long release paper (Grassine Direct type, manufactured by Lintec Corporation, thickness 60 μm; second support member) and the long release paper supplied to the material transport surface of the transport belt 11*a*, which is the first belt, was used instead of a long collector (aluminum foil with a thickness of 20 μm; the first support member).

Example 10

A powder sheet was produced in the same manner as in Example 1, except that, in Example 1, the powder forming apparatus 500 shown in FIG. 5 was prepared instead of the powder forming apparatus 100, a release paper unwound from a release paper roll around which a long release paper (Grassine Direct type, manufactured by Lintec Corporation, thickness 60 μm; second support member) was wound was continuously supplied to the material transport surface (transport surface which transports the electrode material) of the transport belt 11*a* which is the first belt, of the V-shaped transport belt 11, and a collector unwound from a collector roll around which a long collector (aluminum foil with a thickness of 20 μm; third support member) was wound was continuously supplied to the deposition surface of the deposition belt 21.

Example 11

A powder sheet was produced in the same manner as in Example 10 except that, in Example 10, the long release paper was not continuously supplied to the material transport surface of the transport belt 11*a*.

Examples 12, 13, and 15

A powder sheet was produced in the same manner as in Example 1 except that, in Example 1, the inclination angle θ1 of the transport belt 11*a* and the inclination angle θ2 of the transport belt 11*b* in the pair of transport belts 11 are changed as shown in Table 1, respectively.

Example 14 and 16

A powder sheet was produced in the same manner as in Example 1 except that, in Example 1, the diameter r1 of the roll 17 of the transport belt 11*a* and the diameter r2 of the roll 19 of the transport belt 11*b* in the pair of transport belts 11 are changed as shown in Table 1.

Example 17 and 18

A powder sheet was produced in the same manner as in Example 1 except that, in Example 1, the transport surface-to-deposition surface distance between the transport belt 11*a* of the V-shaped transport belt 11 and the deposition belt 21 is changed as shown in Table 1

Comparative Example 1

A powder sheet for comparison was produced in the same manner as in Example 1 except that, in Example 1, the V-shaped transport belt 11 was not used, and in the first step, the electrode material (P-1) for a positive electrode was directly dropped onto the deposition belt 21 through the supplying belt 31 and transported in the direction of arrow B while depositing with the leveling roll 51.

Comparative Example 2

A powder sheet for comparison was produced in the same manner as in Example 1 except that, in Example 1, the V-shaped transport belt 11 was used instead of the pair of crimping rolls having a diameter φ50 mm (the speed at which the electrode material travels was 5 m/min, the shortest distance between the surface of the crimping roll and the outermost surface of the deposition belt: 500 μm), and the electrode material (P-1) for a positive electrode was dropped and introduced from the downstream end portion of the supplying belt 31 to the crimping portion of the crimping roll (first step) and the introduced electrode material (P-1) for a positive electrode was transferred to the deposition belt 21 in a predetermined amount while pressurizing with a crimping roll (gap between rolls: 500 μm) (second to third steps).

Comparative Example 3

A powder sheet for comparison was produced in the same manner as in Example 1 except that, in Example 1, a third step in which the electrode material (P-1) for a positive electrode sent out from the V-shaped transport belt 11 was transferred to the deposition belt 21 was not provided, and the electrode material (P-1) for the positive electrode sent out from the V-shaped transport belt 11 was a powder sheet.

Evaluation

1. Mass Distribution of Powder Sheet

Test pieces each having a size of 1 cm$^2$ were cut out from two locations in the width direction of the powder sheet and ten locations in the longitudinal direction of the powder sheet. A frame-shaped Thomson blade in which the area inside the frame per frame was adjusted to 1 cm$^2$ was used to cut the test piece. The mass of each test piece cut out from a total of 20 places on the powder sheet was measured, and then σ (standard deviation) was obtained from the mass of each test piece. The mass distribution was evaluated based on the obtained σ, and less than 5% was regarded as acceptable.

2. Productivity

In a case where 10 powder sheets were produced, the productivity was evaluated according to the following criteria based on the operating rate calculated according to the following expression. Usually, the time required for producing one powder sheet is 30 seconds. In a case where the operation can be normally performed, 10 powder sheets can be produced in 300 seconds. Therefore, in the following expression, the "target production time" was set to 300 seconds, and 0.6 or more was evaluated as acceptable.

Operating rate = target production time/actual production time    Expression

TABLE 1

| | First step | | | | Second step Pair of transport belts | | | | |
|---|---|---|---|---|---|---|---|---|---|
| | | | | | First belt (downstream side) | | | | |
| | Supply device | | | | | Diameter of roll 16 | Diameter r1 of roll 17 on | | |
| | Supplying belt | Type | Number of devices | Uniformizing roll | Angle θ1 [°] | on introduction side [mm] | transport side [mm] | Belt traveling speed [m/min] | Second support member |
| Example 1 | Presence | Screw feeder | 1 | — | 30 | 30 | 30 | 5 | — |
| Example 2 | Presence | | 2 | — | 30 | 30 | 30 | 5 | — |
| Example 3 | Presence | | 4 | — | 30 | 30 | 30 | 5 | — |
| Example 4 | Presence | | 1 | Uniformizing roll | 30 | 30 | 30 | 5 | — |
| Example 5 | Presence | | 1 | — | 45 | 30 | 30 | 5 | — |
| Example 6 | Presence | | 1 | — | 30 | 30 | 30 | 5 | — |
| Example 7 | Presence | | 1 | — | 30 | 30 | 30 | 5 | Release paper |
| Example 8 | Presence | | 1 | — | 30 | 30 | 30 | 5 | Release paper |
| Example 9 | Presence | | 1 | — | 30 | 30 | 30 | 5 | Collector |
| Example 10 | Presence | | 1 | — | 30 | 30 | 30 | 5 | Release paper |
| Example 11 | Presence | | 1 | — | 30 | 30 | 30 | 5 | — |
| Example 12 | Presence | | 1 | — | 30 | 30 | 30 | 5 | — |
| Example 13 | Presence | | 1 | — | 15 | 30 | 30 | 5 | — |
| Example 14 | Presence | | 1 | — | 30 | 30 | 10 | 5 | — |
| Example 15 | Presence | | 1 | — | 1 | 30 | 30 | 5 | — |
| Example 16 | Presence | | 1 | — | 15 | 15 | 15 | 5 | — |
| Example 17 | Presence | | 1 | — | 30 | 30 | 30 | 5 | — |
| Example 18 | Presence | | 1 | — | 30 | 30 | 30 | 5 | — |
| Comparative Example 1 | Presence | Screw feeder | 1 | — | | | — | | — |
| Comparative Example 2 | Presence | | 1 | — | — | — | 50 | — | — |
| Comparative Example 3 | Presence | | 1 | — | 30 | 30 | 30 | 5 | — |

| | Second step Pair of transport belts | | | | | | |
|---|---|---|---|---|---|---|---|
| | Second belt (upstream side) | | | | | Transport surface-to-transport surface distance*1 on introduction side [mm] | Transport surface-to-transport surface distance*2 on transport side [μm] |
| | Angle θ2 [°] | Diameter of roll 18 on introduction side [mm] | Diameter r2 of roll 19 on transport side [mm] | Belt traveling speed [m/min] | First support member | | |
| Example 1 | 30 | 30 | 30 | 5 | — | 50 | 500 |
| Example 2 | 30 | 30 | 30 | 5 | — | 50 | 500 |
| Example 3 | 30 | 30 | 30 | 5 | — | 50 | 500 |
| Example 4 | 30 | 30 | 30 | 5 | — | 50 | 500 |
| Example 5 | 45 | 30 | 30 | 5 | — | 100 | 500 |
| Example 6 | 30 | 30 | 30 | 5 | Release paper | 50 | 500 |
| Example 7 | 30 | 30 | 30 | 5 | Release paper | 50 | 500 |
| Example 8 | 30 | 30 | 30 | 5 | Collector | 50 | 500 |
| Example 9 | 30 | 30 | 30 | 5 | Release paper | 50 | 500 |
| Example 10 | 30 | 30 | 30 | 5 | — | 50 | 500 |
| Example 11 | 30 | 30 | 30 | 5 | — | 50 | 500 |
| Example 12 | 15 | 30 | 30 | 5 | — | 37.5 | 500 |
| Example 13 | 30 | 30 | 30 | 5 | — | 37.5 | 500 |
| Example 14 | 30 | 30 | 10 | 5 | — | 50 | 1000 |
| Example 15 | 1 | 30 | 30 | 5 | — | 1 | 500 |
| Example 16 | 30 | 30 | 30 | 5 | — | 60 | 1000 |
| Example 17 | 30 | 30 | 30 | 5 | — | 50 | 500 |
| Example 18 | 30 | 30 | 30 | 5 | — | 50 | 500 |
| Comparative Example 1 | — | | — | | — | — | — |

TABLE 1-continued

| | | | | | | | |
|---|---|---|---|---|---|---|---|
| Comparative Example 2 | — | — | 50 | — | — | — | — |
| Comparative Example 3 | 30 | 30 | 30 | 5 | — | 50 | 500 |

| | Third step | | | | | |
|---|---|---|---|---|---|---|
| | Deposition belt | | | | Evaluation | |
| | Presence or absence | Transport surface-to-deposition surface distance D from first belt | Belt traveling speed [m/min] | Third support member | Mass distribution [%] | Productivity |
| Example 1 | Presence | 500 | 5 | — | 1.5 | 0.85 |
| Example 2 | Presence | 500 | 5 | — | 1.8 | 0.85 |
| Example 3 | Presence | 500 | 5 | — | 1.9 | 0.85 |
| Example 4 | Presence | 500 | 5 | — | 1.1 | 0.88 |
| Example 5 | Presence | 500 | 5 | — | 2.8 | 0.92 |
| Example 6 | Presence | 500 | 5 | — | 1.0 | 0.97 |
| Example 7 | Presence | 500 | 5 | — | 0.9 | 0.98 |
| Example 8 | Presence | 500 | 5 | — | 0.9 | 0.98 |
| Example 9 | Presence | 500 | 5 | — | 0.9 | 0.98 |
| Example 10 | Presence | 500 | 5 | Collector | 0.8 | 0.98 |
| Example 11 | Presence | 500 | 5 | Collector | 2.3 | 0.91 |
| Example 12 | Presence | 500 | 5 | — | 2.1 | 0.88 |
| Example 13 | Presence | 500 | 5 | — | 3.1 | 0.78 |
| Example 14 | Presence | 500 | 5 | — | 2.0 | 0.90 |
| Example 15 | Presence | 500 | 5 | — | 3.4 | 0.77 |
| Example 16 | Presence | 500 | 5 | — | 3.3 | 0.78 |
| Example 17 | Presence | 700 | 5 | — | 1.5 | 0.90 |
| Example 18 | Presence | 400 | 5 | — | 1.5 | 0.84 |
| Comparative Example 1 | Presence | 500 | 5 | — | 15 | 0.30 |
| Comparative Example 2 | Presence | — | 5 | — | 8 | 0.40 |
| Comparative Example 3 | | — | | | 6.9 | 0.35 |

[1] The shortest distance between a point P at which a line passing through the axial center of the roll 16 and the material transport surface of the transport belt 11a intersect perpendicularly and a point Q at which the line passing through the axial center of the roll 18 and the material transport surface of the transport belt 11b intersect perpendicularly, on the introduction side of the electrode material of a pair of transport belts, in the side view (see FIG. 6)

[2] The shortest distance between a point R at which a line passing through the axial center of the roll 17 and the material transport surface of the transport belt 11a intersect perpendicularly and a point S at which the line passing through the axial center of the roll 19 and the material transport surface of the transport belt 11b intersect perpendicularly, on the transport side of the electrode material of a pair of transport belts, in the side view (see FIG. 6)

As shown in Table 1, Examples 1 to 18 were superior in mass distribution uniformity and productivity as compared with Comparative Examples 1 to 3.

The entire disclosure of JP2019-149868 filed on Aug. 19, 2019 is incorporated herein by reference.

All literatures, patent applications, and technical standards described herein are incorporated herein by reference to the same extent as if each literature, patent application, or technical standard is specifically and individually indicated as being incorporated by reference.

What is claimed is:

1. A method of manufacturing a formed body for an electrode, comprising:
   a first step of dropping an electrode material containing an electrode active material into a gap between a pair of transport belts and introducing the electrode material between transport surfaces of the pair of transport belts;
   a second step of belt-transporting and pressurizing the introduced electrode material with the pair of transport belts; and
   a third step of transferring the electrode material after the belt transporting and the pressurization, on a deposition belt,
   wherein a transport direction in a transport passage, through which the electrode material is transported, of the deposition belt intersects a transport direction in the transport passage, through which the electrode material is transported, of the pair of transport belts,
   wherein the pair of transport belts include:
   a first belt in which a movement direction of the transport surface in the transport passage through which the electrode material is transported is inclined in a side view to one direction of left-right directions with respect to a direction of antigravitational force, with an inclination angle $\theta 1$ of $0° < \theta 1 \leq 60°$, and
   a second belt in which the movement direction of the transport surface in the transport passage through which the electrode material is transported is inclined in a side view to the other direction in the left-right directions with respect to the direction of antigravitational force, with an inclination angle $\theta 2$ of $0° < \theta 2 \leq 60°$, and
   wherein the second belt and the first belt are placed in this order side by side in the transport direction of the deposition belt for the electrode material, and the inclination angle $\theta 1$ and the inclination angle $\theta 2$ have a relationship of $\theta 2 \leq \theta 1$.

2. The method of manufacturing a formed body for an electrode according to claim 1,
   wherein the electrode material contains a powder.

3. The method of manufacturing a formed body for an electrode according to claim 1,
wherein the second step is a step of gradually increasing a pressure applied to the electrode material toward downstream portion in a belt transport direction of the transport passage for belt-transporting the electrode material.

4. The method of manufacturing a formed body for an electrode according to claim 1,
wherein the second belt and the first belt are placed in this order side by side in the transport direction of the deposition belt for the electrode material,
each of the first belt and the second belt is an endless belt wound around at least two rolls, and
a roll of the first belt and a roll of the second belt, which are positioned at a most downstream portion of the transport passage for the electrode material in the pair of transport belts, satisfy the following Expression 1, Diameter $r1$ of roll of first belt≤Diameter $r2$ of roll of second belt  Expression 1.

5. The method of manufacturing a formed body for an electrode according to claim 1,
wherein the second belt and the first belt are placed in this order side by side in the transport direction of the deposition belt for the electrode material, and
a belt transportation speed of the first belt is higher than a belt transportation speed of the second belt.

6. The method of manufacturing a formed body for an electrode according to claim 1, further comprising:
a step of continuously supplying a long first support member to a transport surface, which transports the electrode material, of the second belt and a deposition surface, on which the electrode material is deposited, of the deposition belt,
wherein in the second step, the introduced electrode material is belt-transported and pressurized by the first support member on the second belt and the first belt, and
in the third step, the electrode material is transferred to a surface of the first support member on the deposition belt.

7. The method of manufacturing a formed body for an electrode according to claim 6, further comprising:
a step of continuously supplying a long second support member to a transport surface, which transports the electrode material, of the first belt and the electrode material transferred onto the deposition belt,
wherein in the second step, the introduced electrode material is belt-transported and pressurized through the first support member on the second belt and the second support member on the first belt, and
in the third step, the electrode material is transferred to the surface of the first support member on the deposition belt in a state of being contact with the second support member.

8. The method of manufacturing a formed body for an electrode according to claim 1, further comprising:
a step of continuously supplying a long third support member onto the deposition belt,
wherein in the third step, the electrode material is transferred to a surface of the third support member on the deposition belt.

9. The method of manufacturing a formed body for an electrode according to claim 8, further comprising:
a step of continuously supplying a long second support member to a transport surface, which transports the electrode material, of the first belt and the electrode material transferred onto the deposition belt,
wherein in the second step, the introduced electrode material is belt-transported and pressurized by the second belt and the second support member on the first belt, and
in the third step, the electrode material is transferred to the surface of the third support member on the deposition belt in a state of being contact with the second support member.

10. The method of manufacturing a formed body for an electrode according to claim 7,
wherein at least one of the first support member, or the second support member is a collector or a release material.

11. The method of manufacturing a formed body for an electrode according to claim 1,
wherein the second belt and the first belt are placed in this order side by side in the transport direction of the deposition belt for the electrode material, and
a belt transportation speed of the deposition belt is higher than a belt transportation speed of the first belt of the pair of transport belts.

12. The method of manufacturing a formed body for an electrode according to claim 1,
wherein in the first step, the electrode material is transported by a supplying belt, and the transported electrode material is dropped downstream portion in as transport direction of the supplying belt.

13. The method of manufacturing a formed body for an electrode according to claim 12,
wherein in the first step, the electrode material is transported by the supplying belt with a uniformizing member in contact with the electrode material.

14. The method of manufacturing a formed body for an electrode according to claim 1,
wherein in the third step, the electrode material is transferred by the deposition belt with a leveling member in contact with the electrode material.

15. The method of manufacturing a formed body for an electrode according to claim 8,
wherein the third support member is a collector or a release material.

* * * * *